US011938732B2

(12) United States Patent
Okubo et al.

(10) Patent No.: US 11,938,732 B2
(45) Date of Patent: Mar. 26, 2024

(54) LIQUID EJECTING HEAD AND LIQUID EJECTING APPARATUS

(71) Applicant: Seiko Epson Corporation, Tokyo (JP)

(72) Inventors: Katsuhiro Okubo, Azumino (JP); Takahiro Kanegae, Shiojiri (JP); Kentaro Murakami, Matsumoto (JP); Shingo Tomimatsu, Shiojiri (JP); Hiroki Kobayashi, Matsumoto (JP); Haruhisa Uezawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 49 days.

(21) Appl. No.: 17/702,059

(22) Filed: Mar. 23, 2022

(65) Prior Publication Data

US 2022/0305787 A1 Sep. 29, 2022

(30) Foreign Application Priority Data

Mar. 24, 2021 (JP) ................................ 2021-049392

(51) Int. Cl.
*B41J 2/14* (2006.01)

(52) U.S. Cl.
CPC ......... *B41J 2/14233* (2013.01); *B41J 2/1429* (2013.01); *B41J 2002/14306* (2013.01); *B41J 2202/08* (2013.01); *B41J 2202/20* (2013.01)

(58) Field of Classification Search
CPC .................. B41J 2/14233; B41J 2/1429; B41J 2002/14306; B41J 2202/08; B41J 2202/20
See application file for complete search history.

(56) References Cited

U.S. PATENT DOCUMENTS

| | | | | |
|---|---|---|---|---|
| 9,421,784 | B2 * | 8/2016 | Kumagai | ............. B41J 2/16526 |
| 2010/0073433 | A1 | 3/2010 | Shimizu et al. | |
| 2017/0008291 | A1 | 1/2017 | Owaki et al. | |
| 2017/0291418 | A1 | 10/2017 | Emi et al. | |
| 2019/0143687 | A1 | 5/2019 | Zhang | |

FOREIGN PATENT DOCUMENTS

| | | | | |
|---|---|---|---|---|
| JP | 2010-076176 | A | 4/2010 | |
| JP | 2010-214879 | A | 9/2010 | |
| JP | 2017-019153 | A | 1/2017 | |
| JP | 2017-185739 | A | 10/2017 | |
| JP | 2019-089310 | A | 6/2019 | |
| JP | 3 628 493 | A1 * | 4/2020 | ................ B41J 2/14 |

* cited by examiner

*Primary Examiner* — Geoffrey S Mruk
(74) *Attorney, Agent, or Firm* — Harness, Dickey & Pierce, P.L.C.

(57) ABSTRACT

A liquid ejecting head supported by a support body includes: a first head chip; a holder having a holding portion holding the first head chip and a flange portion; and a heater heating the holding portion, in which the holding portion has a heat receiving portion receiving heat from the heater, and a shortest path of heat transferred through the holder from the heat receiving portion to the flange portion is bent or curved at two or more points.

20 Claims, 13 Drawing Sheets

LIQUID EJECTING HEAD AND LIQUID EJECTING APPARATUS

The present application is based on, and claims priority from JP Application Serial Number 2021-049392, filed Mar. 24, 2021, the disclosure of which is hereby incorporated by reference herein in its entirety.

BACKGROUND

1. Technical Field

The present disclosure relates to a liquid ejecting head and a liquid ejecting apparatus.

2. Related Art

In general, a liquid ejecting apparatus such as an ink jet printer is provided with a liquid ejecting head ejecting a liquid such as ink as droplets. The liquid ejecting head is supported by a support body as in the case of, for example, the head unit described in JP-A-2017-185739.

The head unit described in JP-A-2017-185739 has a plurality of drivers having ink ejecting nozzles and a holder holding the drivers, which are made of a conductive material such as metal for the purpose of grounding.

The liquid ejecting head may be provided with a heater heating a liquid as in the case of, for example, the ink jet recording head described in JP-A-2010-214879.

In a configuration in which the heater of JP-A-2010-214879 is applied to the head unit described in JP-A-2017-185739, the heat from the heater is easily dissipated to the support body via the holder. As a result, the configuration is problematic in that the driver cannot be efficiently heated by the heater.

SUMMARY

In order to solve the above problems, a liquid ejecting head according to an aspect of the present disclosure is supported by a support body and includes: a first head chip ejecting a liquid; a holder having a holding portion holding the first head chip and a flange portion coming into contact with the support body at a position away from the holding portion; and a heater heating the holding portion, in which the holding portion has a heat receiving portion receiving heat from the heater, and a shortest path of heat transferred through the holder from the heat receiving portion to the flange portion is bent or curved at two or more points.

A liquid ejecting head according to another aspect of the present disclosure is supported by a support body and includes: a head chip having a nozzle surface provided with a nozzle ejecting a liquid in an ejection direction; a holder having a holding portion holding the head chip, a flange portion coming into contact with the support body at a position away from the holding portion, an outer wall portion coupled to the flange portion and surrounding the holding portion when viewed in the ejection direction, and a coupling portion coupling the holding portion and the outer wall portion, the holding portion protruding from the coupling portion in a direction opposite to the ejection direction and the outer wall portion extending from the coupling portion toward the flange portion in the direction opposite to the ejection direction; and a heater heating the holding portion.

A liquid ejecting apparatus according to an aspect of the present disclosure includes: the liquid ejecting head of any of the above aspects; and a support body supporting the liquid ejecting head.

DESCRIPTION OF EXEMPLARY EMBODIMENTS

Figure 1:
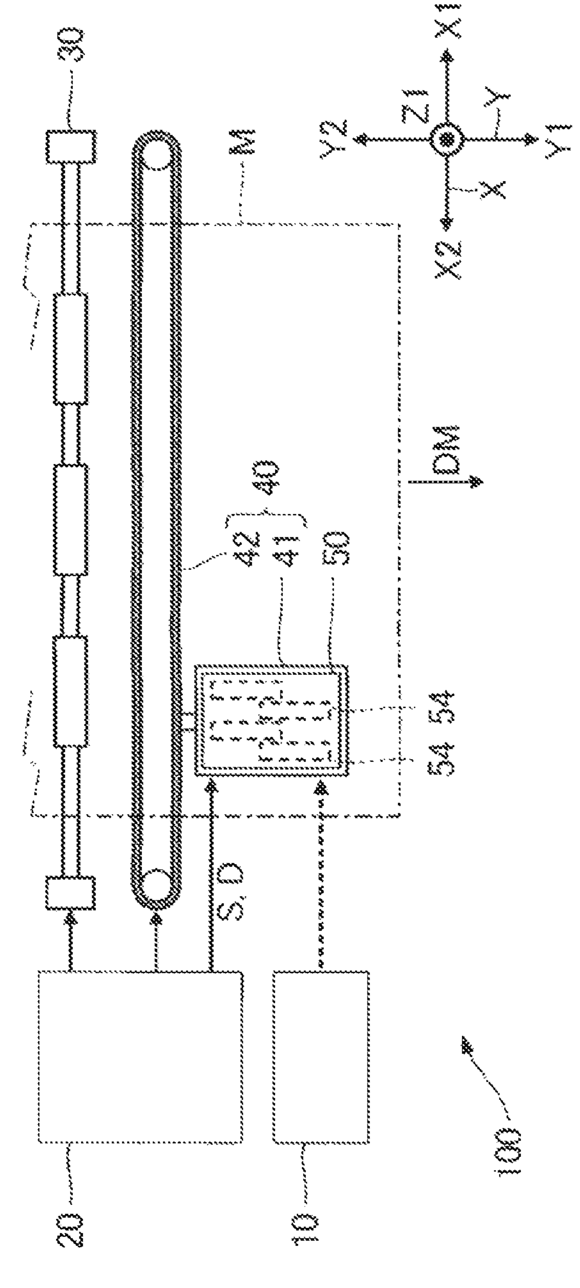
FIG. 1 is a schematic view illustrating a configuration example of a liquid ejecting apparatus according to a first embodiment.

Hereinafter, preferred embodiments according to the present disclosure will be described with reference to the accompanying drawings. In the drawings, the dimensions and scale of each portion are appropriately different from the actual ones and some parts are schematically illustrated for easy understanding. In addition, the scope of the present disclosure is not limited to these forms unless it is stated in the following description that the present disclosure is particularly limited.

In the following description, mutually intersecting X, Y, and Z axes are appropriately used for convenience. In addition, in the following description, one direction along the X axis is an X1 direction and the direction opposite to the X1 direction is an X2 direction. Likewise, Y1 and Y2 directions are opposite to each other along the Y axis. In addition, Z1 and Z2 directions are opposite to each other along the Z axis. In addition, viewing in the Z axis direction may be simply referred to as "plan view". The Y or Y2 direction is an example of "first direction". The X1 or X2 direction is an example of "second direction".

Here, typically, the Z axis is a vertical axis and the Z2 direction corresponds to the downward direction in the vertical direction. However, the Z axis may not be vertical. Although the X, Y, and Z axes are typically orthogonal to each other, the axes are not limited thereto and may intersect at an angle ranging, for example, from 80° to 100°.

1. First Embodiment

1-1. Schematic Configuration of Liquid Ejecting Apparatus

FIG. 1 is a schematic view illustrating a configuration example of a liquid ejecting apparatus 100 according to a first embodiment. The liquid ejecting apparatus 100 is an ink jet printing apparatus ejecting ink, which is an example of "liquid", as droplets onto a medium M. The medium M is typically printing paper. The medium M is not limited to printing paper and may be an object of printing of any material such as a resin film and a cloth.

As illustrated in FIG. 1, the liquid ejecting apparatus 100 has a liquid storage portion 10, a control unit 20, a transport mechanism 30, a moving mechanism 40, and a liquid ejecting head 50.

The liquid storage portion 10 is an ink storage container. Examples of a specific aspect of the liquid storage portion 10 include a cartridge that can be attached to and detached from the liquid ejecting apparatus 100, a bag-shaped ink pack formed of a flexible film, and a container such as an ink-replenishable ink tank.

The liquid storage portion 10 has a plurality of containers (not illustrated) where different types of inks are stored. The inks stored in the containers are not particularly limited, examples thereof include cyan ink, magenta ink, yellow ink, black ink, clear ink, white ink, and a treatment liquid, and combinations of two or more of these are used. The composition of the ink is not particularly limited, and the ink may be, for example, a water-based ink in which a coloring material such as a dye and a pigment is dissolved in a water-based solvent, a solvent-based ink in which a coloring material is dissolved in an organic solvent, or an ultraviolet-curable ink.

Exemplified in the present embodiment is a configuration in which four different types of inks are used. The inks have different colors such as cyan, magenta, yellow, and black.

The control unit 20 controls the operation of each element of the liquid ejecting apparatus 100. For example, the control unit 20 includes a processing circuit such as a central processing unit (CPU) and a field programmable gate array (FPGA) and a storage circuit such as a semiconductor memory. The control unit 20 outputs a drive signal D and a control signal S toward the liquid ejecting head 50. The drive signal D includes a drive pulse driving the drive element of the liquid ejecting head 50. The control signal S specifies whether or not to supply the drive signal D to the drive element.

The transport mechanism 30 transports the medium M in a transport direction DM, which is the Y1 direction, under the control of the control unit 20. The moving mechanism 40 reciprocates the liquid ejecting head 50 in the X1 and X2 directions under the control of the control unit 20. In the example illustrated in FIG. 1, the moving mechanism 40 has a substantially box-shaped support body 41 called a carriage and accommodating the liquid ejecting head 50 and a transport belt 42 to which the support body 41 is fixed. The liquid storage portion 10 as well as the liquid ejecting head 50 may be mounted in the support body 41.

The liquid ejecting head 50 has a plurality of head chips 54 as will be described later. Under the control of the control unit 20, the liquid ejecting head 50 ejects the ink supplied from the liquid storage portion 10 from each of a plurality of nozzles of the head chips 54 toward the medium M in the Z2 direction (ejection direction). This ejection is performed in parallel with the transport of the medium M by the transport mechanism 30 and the reciprocating movement of the liquid ejecting head 50 by the moving mechanism 40. As a result, a predetermined ink-based image is formed on the surface of the medium M.

The liquid storage portion 10 may be coupled to the liquid ejecting head 50 via a circulation mechanism. The circulation mechanism supplies ink to the liquid ejecting head 50 and collects the ink discharged from the liquid ejecting head 50 for resupply to the liquid ejecting head 50. As a result of the operation of the circulation mechanism, an increase in ink viscosity can be suppressed and air bubble retention in ink can be reduced.

1-2. State of Liquid Ejecting Head Attachment

Figure 2:
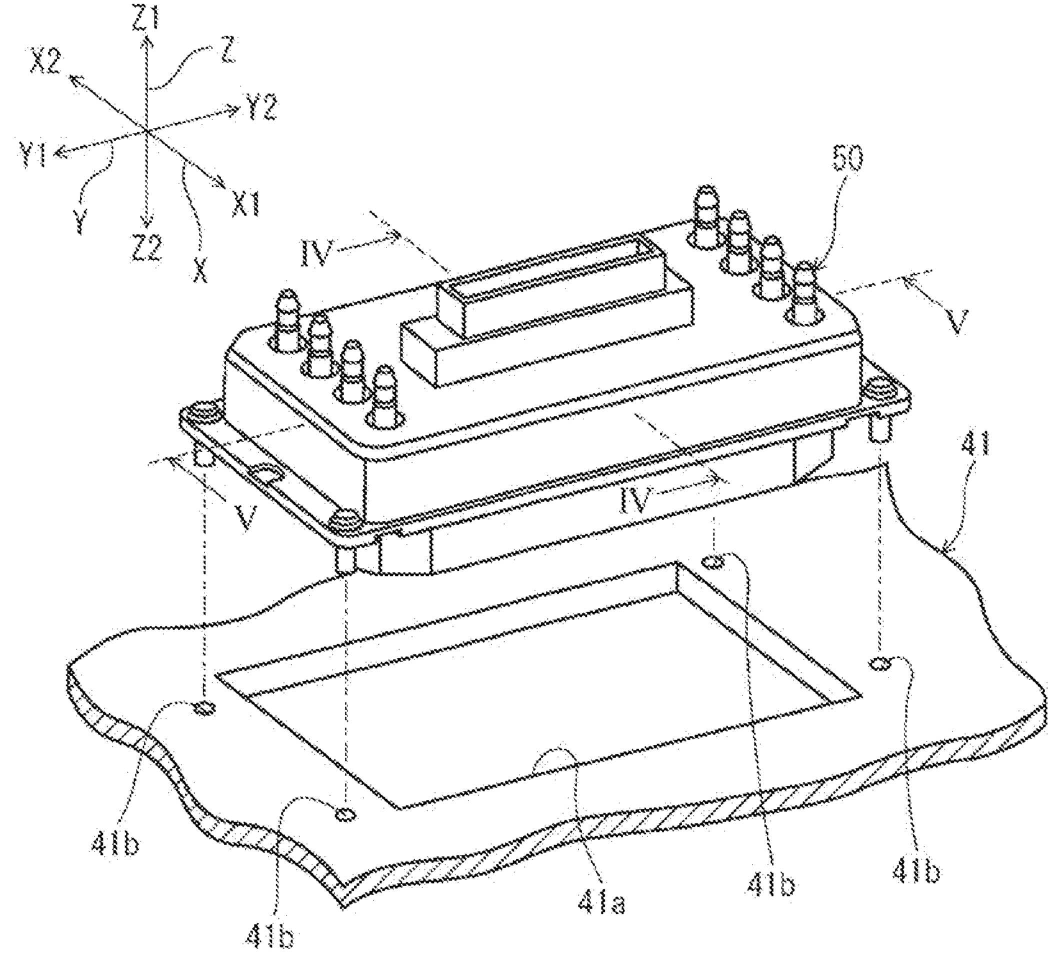
FIG. 2 is a perspective view of a liquid ejecting head and a support body according to the first embodiment.

FIG. 2 is a perspective view of the liquid ejecting head 50 and the support body 41 according to the first embodiment. As illustrated in FIG. 2, the liquid ejecting head 50 is supported by the support body 41. The support body 41 is a member supporting the liquid ejecting head 50. In the present embodiment, the support body 41 is a substantially box-shaped carriage as described above. The constituent material of the support body 41 is not particularly limited, and preferable examples thereof include a metal material such as stainless steel, aluminum, titanium, and a magnesium alloy. When the support body 41 is made of a metal material, the rigidity of the support body 41 can be enhanced with ease, and thus the liquid ejecting head 50 can be stably supported with respect to the support body 41. In addition, the support body 41 is conductive in this case, and thus a reference potential can be supplied to the liquid ejecting head 50 via the support body 41.

Here, the support body 41 is provided with an opening 41*a* and a plurality of screw holes 41*b*. In the present embodiment, the support body 41 has a substantially box shape having a plate-shaped bottom portion and the opening 41*a* and the screw holes 41*b* are provided in, for example, the bottom portion. The liquid ejecting head 50 is fixed to the support body 41 by screwing using the screw holes 41*b* with the liquid ejecting head 50 inserted in the opening 41*a*. As described above, the liquid ejecting head 50 is attached with respect to the support body 41.

In the example illustrated in FIG. 2, the liquid ejecting head 50 that is attached to the support body 41 is one in number. The liquid ejecting head 50 that is attached to the support body 41 may be two or more in number. In this case, the support body 41 is appropriately provided with, for example, the opening 41*a* that corresponds in number or shape to the number.

1-3. Configuration of Liquid Ejecting Head

Figure 3:
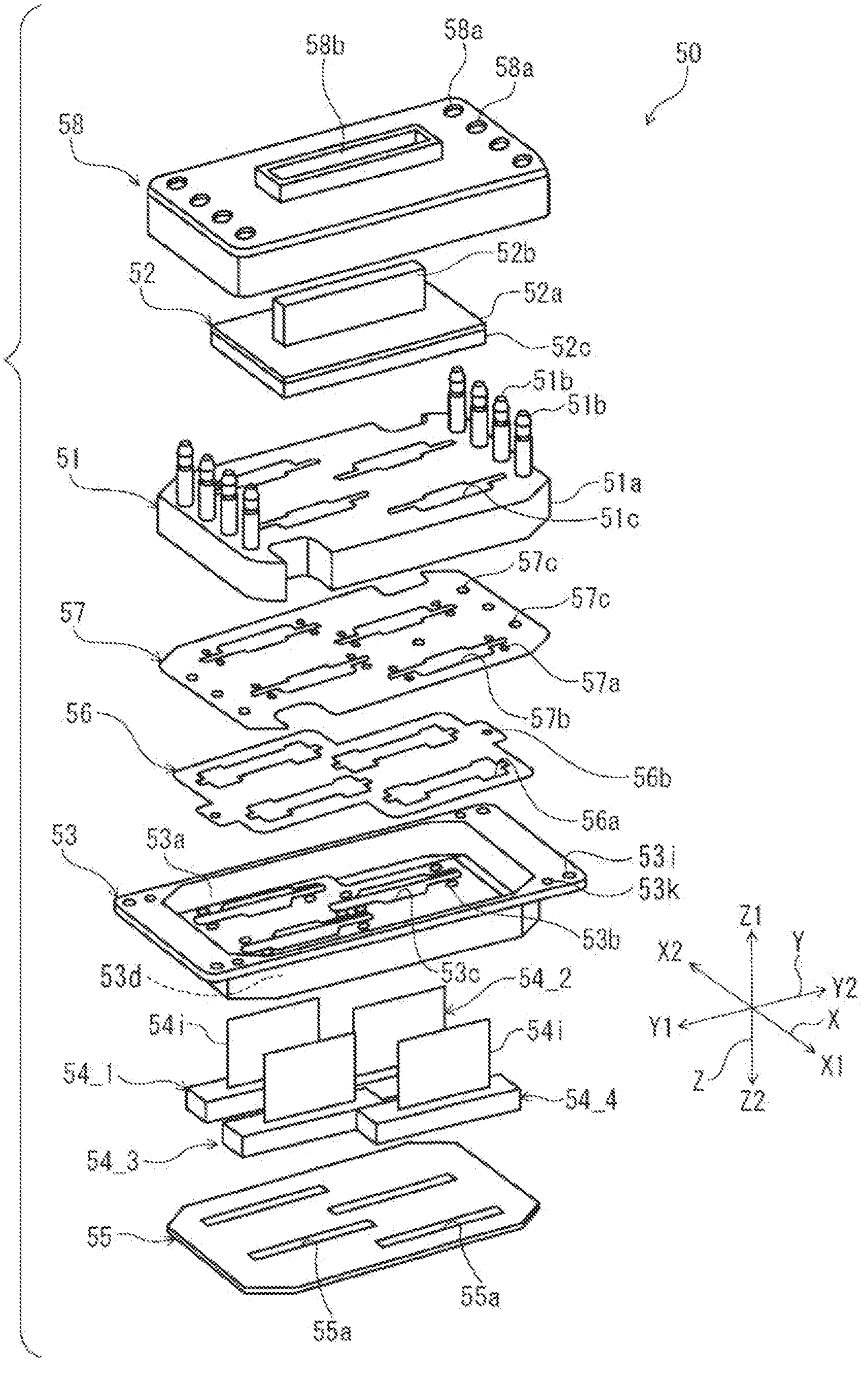
FIG. 3 is an exploded perspective view of the liquid ejecting head according to the first embodiment.
Figure 4:
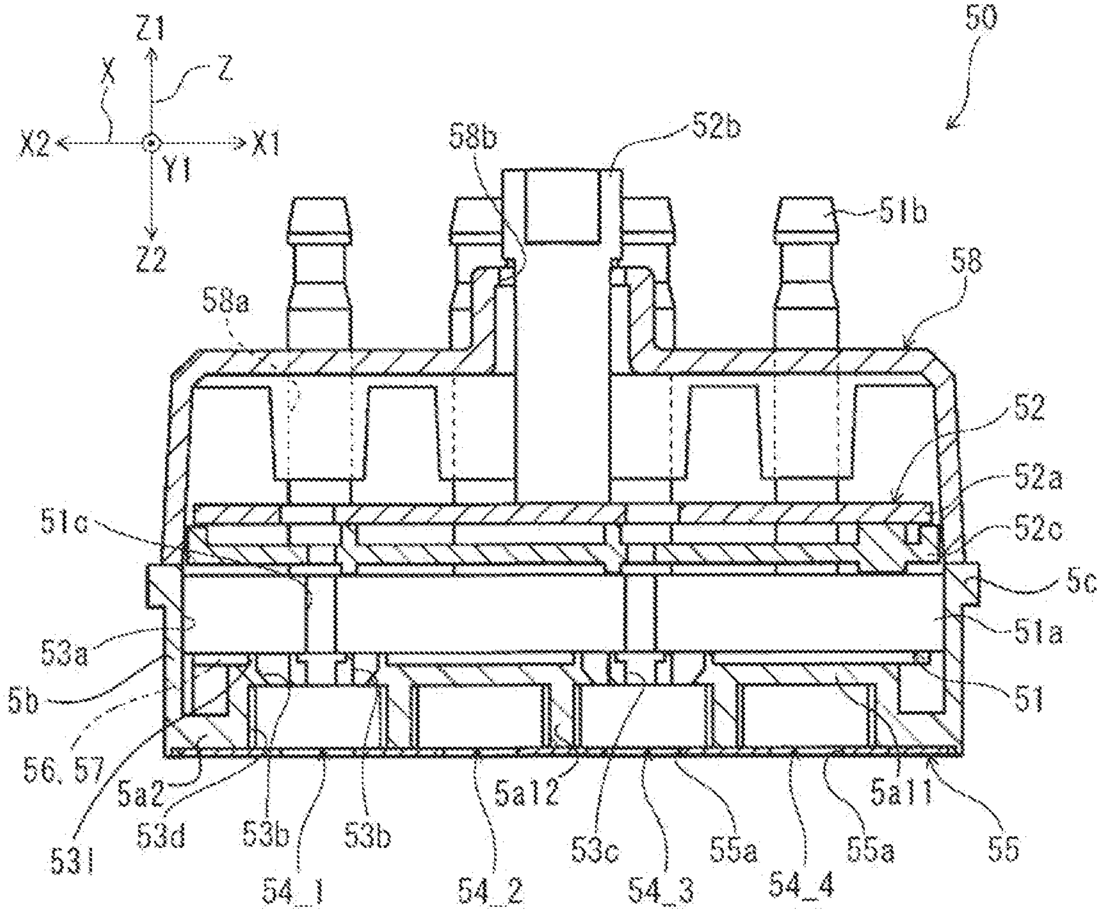
FIG. 4 is a cross-sectional view taken along line IV-IV in FIG. 2.
Figure 5:
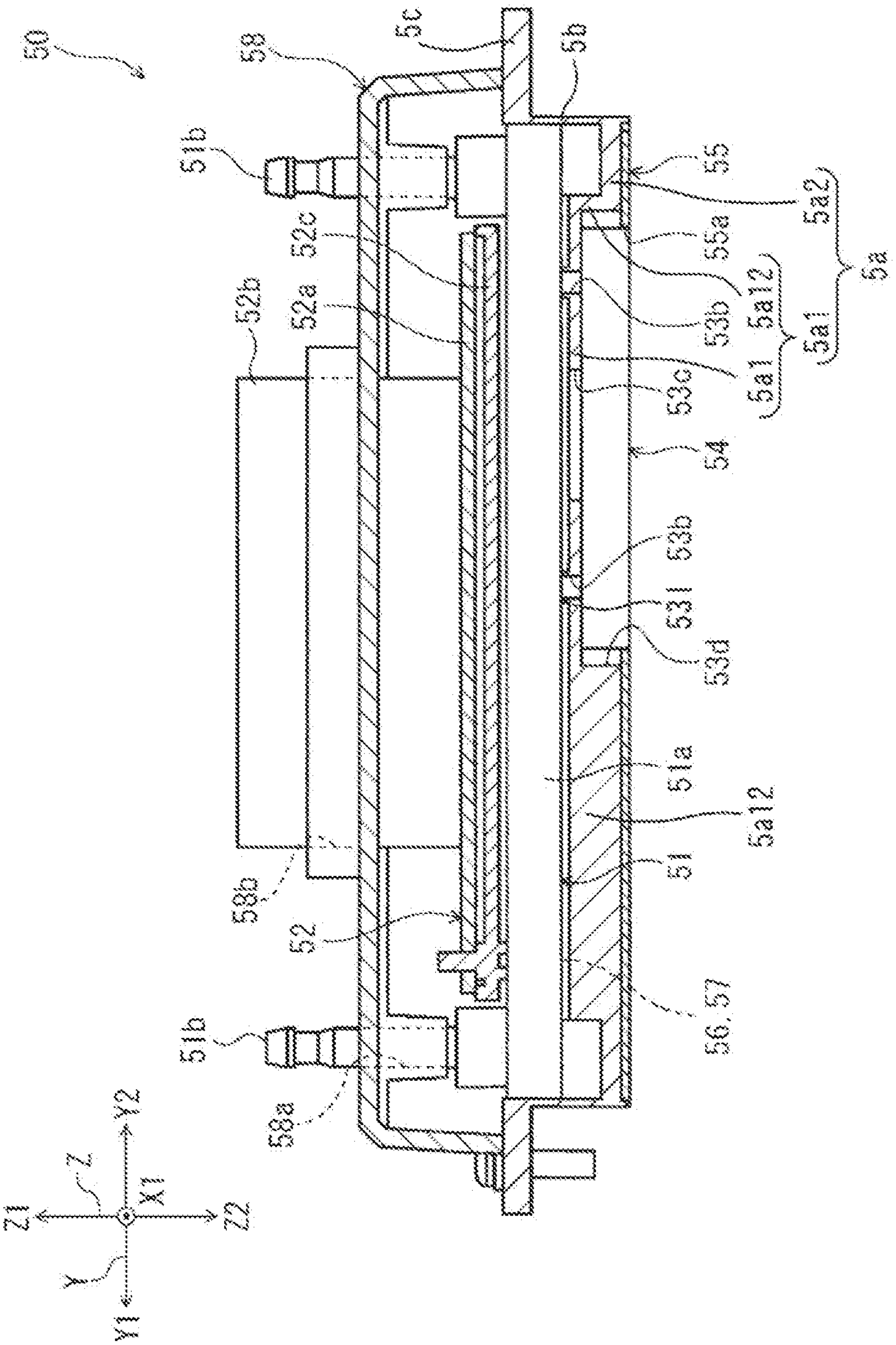
FIG. 5 is a cross-sectional view taken along line V-V in FIG. 2.
Figure 11:
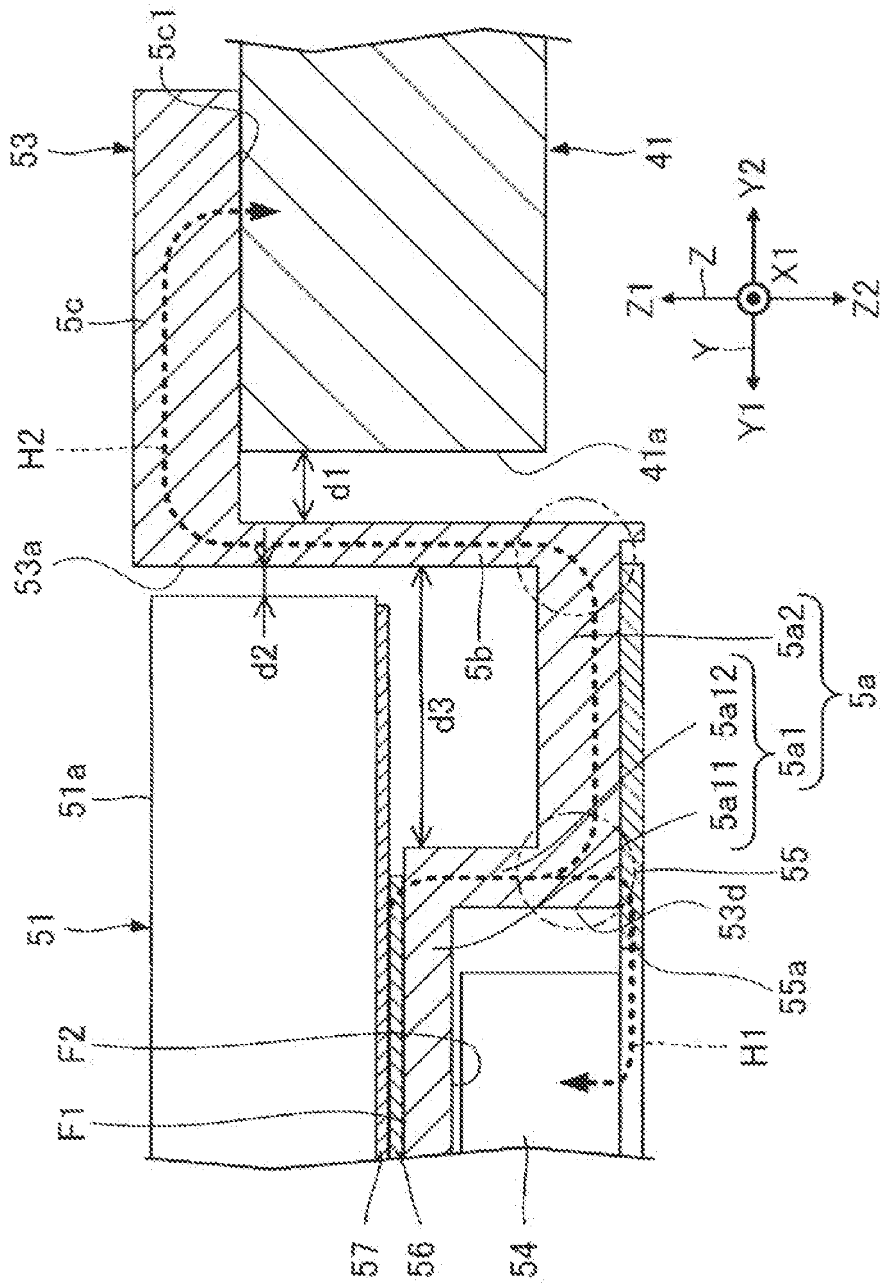
FIG. 11 is a diagram illustrating a transfer path of heat from the heater in the first embodiment.

FIG. 3 is an exploded perspective view of the liquid ejecting head 50 according to the first embodiment. FIG. 4 is a cross-sectional view taken along line IV-IV in FIG. 2. FIG. 5 is a cross-sectional view taken along line V-V in FIG. 2. For convenience, each portion of the liquid ejecting head 50 in FIGS. 3 to 5 is briefly illustrated as appropriate. For example, although a gap d2 is provided between an outer wall portion 5*b* and a flow path structure 51 as illustrated in FIG. 11 to be described later, the gap is not illustrated in FIGS. 4 and 5 and this non-illustration is for convenience of drawing.

As illustrated in FIG. 3, the liquid ejecting head 50 has the flow path structure 51, a substrate unit 52, a holder 53, four head chips 54_1 to 54_4, a fixing plate 55, a heater 56, a heat transfer member 57, and a cover 58. These are arranged in the order of the cover 58, the substrate unit 52, the flow path structure 51, the heat transfer member 57, the heater 56, the holder 53, the four head chips 54, and the fixing plate 55 toward the Z2 direction. Hereinafter, the portions of the liquid ejecting head 50 will be described in sequence.

The heat transfer member 57 is an example of "second heat transfer member". In addition, each of the head chips 54_1 to 54_4 is the head chip 54 illustrated in FIG. 1. Here, the head chip 54_1 is an example of "first head chip". The head chip 54_2 is an example of "second head chip". The head chip 54_3 is an example of "third head chip". The head chip 54_4 is an example of "fourth head chip". In the following description, each of the head chips 54_1 to 54_4 is referred to as the head chip 54 when the head chips 54_1 to 54_4 are not distinguished.

Provided in the flow path structure 51 is a flow path for supplying the ink stored in the liquid storage portion 10 to the four head chips 54. The flow path structure 51 has a flow path member 51*a* and eight coupling pipes 51*b*.

The flow path member 51*a* is provided with four supply flow paths (not illustrated) provided for each of the four types of inks and four discharge flow paths (not illustrated) provided for each of the four types of inks. Each of the four supply flow paths has one introduction port where ink is supplied and two discharge ports where ink is discharged. Each of the four discharge flow paths has two introduction ports where ink is supplied and one discharge port where ink is discharged. Each of the introduction ports of the supply flow paths and the discharge ports of the discharge flow paths is provided on the surface of the flow path member 51*a* that faces the Z1 direction. On the other hand, each of the discharge ports of the supply flow paths and the introduction ports of the discharge flow paths is provided on the surface of the flow path member 51*a* that faces the Z2 direction.

In addition, the flow path member 51*a* is provided with a plurality of wiring holes 51*c*. A wiring substrate 54*i* (described later) of the head chip 54 is passed through each of the wiring holes 51*c* toward the substrate unit 52. As for the side surface of the flow path member 51*a*, notched parts are provided at two points in the circumferential direction. Disposed in the space resulting from the part is, for example, a component such as wiring (not illustrated) coupling the heater 56 and the substrate unit 52. In addition, the flow path member 51*a* is provided with a hole (not illustrated) and fixing with respect to the holder 53 is performed by screwing using the hole.

The flow path member 51*a* is configured by a laminate (not illustrated) in which a plurality of substrates are laminated in the direction along the Z axis. The respective substrates are appropriately provided with grooves and holes for the supply and discharge flow paths described above. The substrates are mutually joined by means of, for example, an adhesive, brazing, welding, or screwing. If necessary, a sheet-shaped seal member made of a rubber material or the like may be appropriately disposed between the substrates. In addition, the number, thickness, and so on of the substrates that constitute the flow path member 51*a* are determined in accordance with an aspect such as the shapes of the supply and discharge flow paths and are any not particularly limited.

It is preferable that a material that is satisfactory in terms of thermal conductivity is used as the constituent material of each of the substrates, and preferable examples thereof include a metal material (e.g. stainless steel, titanium, and magnesium alloy) and a ceramics material (e.g. silicon carbide, aluminum nitride, sapphire, alumina, silicon nitride, cermet, and yttria) having a thermal conductivity of 10.0 W/m·K or more at room temperature (20° C.). By configuring the flow path member 51*a* using such a metal or ceramics material, the ink in the flow path member 51*a* can be efficiently heated by the heat from the heater 56.

Each of the eight coupling pipes 51*b* is a pipe body protruding from the surface of the flow path member 51*a* that faces the Z1 direction. The eight coupling pipes 51*b* correspond to the four supply flow paths and the four discharge flow paths described above and are coupled to the introduction ports of the supply flow paths or the discharge ports of the discharge flow paths that correspond. Although the constituent material of each coupling pipe 51*b* is not particularly limited, it is preferable to use a metal material (e.g. stainless steel, titanium, and magnesium alloy) or a ceramics material (e.g. silicon carbide, aluminum nitride, sapphire, alumina, silicon nitride, cermet, and yttria).

Of the eight coupling pipes 51*b*, the four that correspond to the four supply flow paths described above are coupled to the liquid storage portion 10 so as to receive the supply of different types of inks. Of the eight coupling pipes 51*b*, the four that correspond to the four discharge flow paths are used by being coupled to, for example, a discharge container for discharging ink on a predetermined occasion such as when the liquid ejecting head 50 is initially filled with ink or a sub-tank disposed between the liquid storage portion 10 and the liquid ejecting head 50 and capable of holding a liquid. On normal occasions such as printing, the four coupling pipes 51*b* that correspond to the four discharge flow paths are blocked by a sealing body such as a cap. When the liquid storage portion 10 is coupled to the liquid ejecting head 50 via the circulation mechanism, the four coupling pipes 51*b* that correspond to the four discharge flow paths are normally coupled to the ink collection flow path of the circulation mechanism.

The substrate unit 52 is an assembly having a mounting component for electrically coupling the liquid ejecting head 50 to the control unit 20. The substrate unit 52 has a circuit substrate 52*a*, a connector 52*b*, and a support plate 52*c*.

The circuit substrate 52*a* is a printed wiring substrate such as a rigid wiring substrate having wiring for electrically coupling each head chip 54 and the connector 52*b*. The circuit substrate 52*a* is disposed on the flow path structure 51 via the support plate 52*c*, and the connector 52*b* is installed on the surface of the circuit substrate 52*a* that faces the Z1 direction.

The connector 52*b* is a coupling component for electrically coupling the liquid ejecting head 50 and the control unit 20. The support plate 52*c* is a plate-shaped member for attaching the circuit substrate 52*a* with respect to the flow path structure 51. The circuit substrate 52*a* is mounted on one surface of the support plate 52*c*, and the circuit substrate 52*a* is fixed by screwing or the like with respect to the support plate 52*c*. The other surface of the support plate 52*c* is in contact with the flow path structure 51. The support plate 52*c* is fixed to the flow path structure 51 by screwing or the like in that state.

Here, the support plate 52*c* has not only a function of supporting the circuit substrate 52*a* as described above but also a function of ensuring electrical insulation between the circuit substrate 52*a* and the flow path structure 51 and providing heat insulation between the heater 56 and the circuit substrate 52*a*. From the viewpoint of suitably exhibiting these functions, it is preferable that the constituent material of the support plate 52*c* is a material excellent in terms of electrical and thermal insulation. Specifically, it is preferable that the material is, for example, a resin material such as modified polyphenylene ether resin (e.g. Zylon), polyphenylene sulfide resin, and polypropylene resin. Zylon is a registered trademark. In addition, the constituent material of the support plate 52*c* may include a fiber base material (e.g. glass fiber), a filler (e.g. alumina particles), or the like in addition to the resin material.

The holder 53 is a structure accommodating and supporting the four head chips 54. It is preferable that a material that is satisfactory in terms of thermal conductivity is used as the constituent material of the holder 53, and preferable examples thereof include a metal material (e.g. stainless steel, titanium, and magnesium alloy) and a ceramics material (e.g. silicon carbide, aluminum nitride, sapphire, alumina, silicon nitride, cermet, and yttria) having a thermal conductivity of 10.0 W/m·K or more at room temperature (20° C.). By configuring the holder 53 using such a metal or ceramics material, the heat from the heater 56 can be efficiently transferred to each head chip 54 via the holder 53.

The holder 53 has a substantially tray shape and has a recess 53*a*, a plurality of ink holes 53*b*, a plurality of wiring holes 53*c*, a plurality of recesses 53*d*, a plurality of screw holes 53*i*, and a plurality of screw holes 53*k*. The recess 53*a* is open toward the Z1 direction and is a space where the laminate of the flow path member 51*a*, the heater 56, and the heat transfer member 57 is disposed. Each of the ink holes 53*b* is a flow path allowing ink to flow between the head chip 54 and the flow path structure 51. The wiring substrate 54*i* of the head chip 54 is passed through each of the wiring holes 53*c* toward the substrate unit 52. Each of the recesses 53*d* is open toward the Z2 direction and is a space where the head chip 54 is disposed. The screw holes 53*i* are screw holes for screwing the holder 53 with respect to the support body 41. The screw holes 53*k* are screw holes for screwing the cover 58 with respect to the holder 53. Details of the holder 53 will be described later with reference to FIGS. 7 to 9.

Each head chip 54 ejects ink. Each head chip 54 has a plurality of nozzles ejecting a first ink and a plurality of nozzles ejecting a second ink, which is different in type from the first ink. Here, the first and second inks are two of the four types of inks described above. For example, two of the four types of inks are respectively used as the first and second inks for the head chip 54_1 and the head chip 54_2. The other two are respectively used for the head chip 54_3 and the head chip 54_4. Each head chip 54 is provided with the wiring substrate 54*i*. In FIG. 3, the configuration of each head chip 54 is illustrated in a simplified manner. Details of the configuration of the head chip 54 will be described later with reference to FIG. 6.

The fixing plate 55 is a plate-shaped member to which the four head chips 54 and the holder 53 are fixed. Specifically, the fixing plate 55 is disposed with the four head chips 54 sandwiched between the fixing plate 55 and the holder 53 and each head chip 54 and the holder 53 are fixed by means of an adhesive or the like.

The fixing plate 55 is provided with a plurality of opening portions 55*a* exposing a nozzle surface FN of the four head chips 54. In the example illustrated in FIG. 3, the opening portions 55*a* are individually provided for each head chip 54. The fixing plate 55 is made of, for example, a metal material such as stainless steel, titanium, and a magnesium alloy and has a function of transferring heat from the holder 53 to each head chip 54. In addition, the fixing plate 55 is conductive. Accordingly, the fixing plate 55 is grounded via the holder 53 and the support body 41 and also functions as an electrostatic shield for preventing the effect of static electricity from the medium M or the like. The fixing plate 55 may be configured by laminating plate-shaped members made of metal materials.

The fixing plate 55 has a rectangular or substantially rectangular outer shape in a plan view. Here, "substantially rectangular" is a concept including a shape that can be regarded as a substantially rectangular shape and a shape that is similar to a rectangle. The shape that can be regarded as a substantially rectangular shape can be obtained by, for example, performing chamfering such as C chamfering and R chamfering on the four corners of a rectangle. The shape similar to a rectangle is, for example, an octagon including four sides along the rectangle and four sides shorter than each of the four sides. The opening portion 55*a* may be shared by two or more head chips 54. When the opening portions 55*a* are individually provided for each head chip 54, the area of contact between the fixing plate 55 and each head chip 54 can be increased with ease, and thus heat can be efficiently transferred from the holder 53 to each head chip 54.

The heater 56 is a planar heater disposed between the flow path structure 51 and the holder 53. The heater 56 is, for example, a film heater having an insulating film and a thin film-shaped heat-generating resistor. The film is made of a resin material such as polyimide and polyethylene terephthalate (PET). The heat-generating resistor is patterned on the film and is made of a metal material such as stainless steel, copper, and a nickel alloy. In addition, the heater 56 may be a planar heater such as a ceramic heater and a silicone rubber heater in which a heating element is sandwiched between silicone rubber and silicone rubber containing glass fibers.

The heater 56 is provided with a plurality of holes 56*a* and a plurality of holes 56*b*. Each of the holes 56*a* is a hole through which the wiring substrate 54*i* of the head chip 54 and a flow path pipe 531 formed in the holder 53 are passed. The ink hole 53*b* formed in the flow path pipe 531 is a part of the flow path that allows ink to flow between the head chip 54 and the flow path structure 51. The flow path pipe 531 protrudes in the Z1 direction from, for example, the upper surface of the holder 53 facing the Z1 direction (first surface F1 to be described later). The tip of the flow path pipe 531 on the Z1 direction side is bonded to the lower surface of the flow path structure 51 facing the Z2 direction. As a result, the ink hole 53*b* is liquid-tightly sealed in relation to the flow path in the flow path structure 51. Each of the holes 56*b* is a hole for screwing the heater 56 with respect to the holder 53. Details of the shape of the heater 56 in a plan view will be described later with reference to FIG. 10.

The heat transfer member 57, which has thermal conductivity, is a plate-shaped member disposed between the flow path structure 51 and the heater 56. The heat transfer member 57 has a function of transferring heat in each of the thickness and plane directions. By means of this function, the heat from the heater 56 is efficiently transferred to the flow path structure 51 via the heat transfer member 57. Here, the heating unevenness of the flow path structure 51 attributable to the heat generation distribution of the heater 56 is reduced by means of the plane-direction heat transfer of the heat transfer member 57.

The heat transfer member 57 is made of, for example, a metal material or a thermally conductive material such as ceramics (e.g. silicon carbide, aluminum nitride, sapphire, alumina, silicon nitride, cermet, and yttria). Examples of the metal material include stainless steel, aluminum, titanium, and a magnesium alloy. The heat transfer member 57 is preferably a material having a high level of thermal conductivity with respect to the flow path structure 51 and the holder 53. By providing the heat transfer member 57 having a high level of thermal conductivity as described above, the heat from the heater 56 can be easily moved in the direction parallel to the nozzle surface FN. As a result, the heat from the heater 56 can be uniformly and efficiently transferred to the flow path structure 51, which is an object of heating, via the heat transfer member 57.

The heat transfer member 57 is provided with a plurality of holes 57*a*, a plurality of wiring holes 57*b*, and a plurality of holes 57*c*. The flow path pipe 531 is inserted through each of the holes 57*a*. The wiring substrate 54*i* of the head chip 54 is passed through each of the wiring holes 57*b* toward the substrate unit 52. The holes 57*c* are holes for screwing the heat transfer member 57 with respect to the holder 53. In the present embodiment, two of the holes 57*c* are used so that the heater 56 and the heat transfer member 57 are fixed to the holder 53 by being tightened together. Details of the shape of the heat transfer member 57 in a plan view will be described later with reference to FIG. 10.

The cover 58 is a box-shaped member accommodating the substrate unit 52. The cover 58 is made of, for example, a resin material such as modified polyphenylene ether resin, polyphenylene sulfide resin, and polypropylene resin as in the case of the support plate 52*c* described above.

The cover 58 is provided with eight through holes 58*a* and an opening portion 58*b*. The eight through holes 58*a* correspond to the eight coupling pipes 51*b* of the flow path structure 51, and the corresponding coupling pipe 51*b* is inserted into each through hole 58*a*. The connector 52*b* is passed through the opening portion 58*b* from the inside to the outside of the cover 58.

1-4. Configuration of Head Chip

Figure 6:
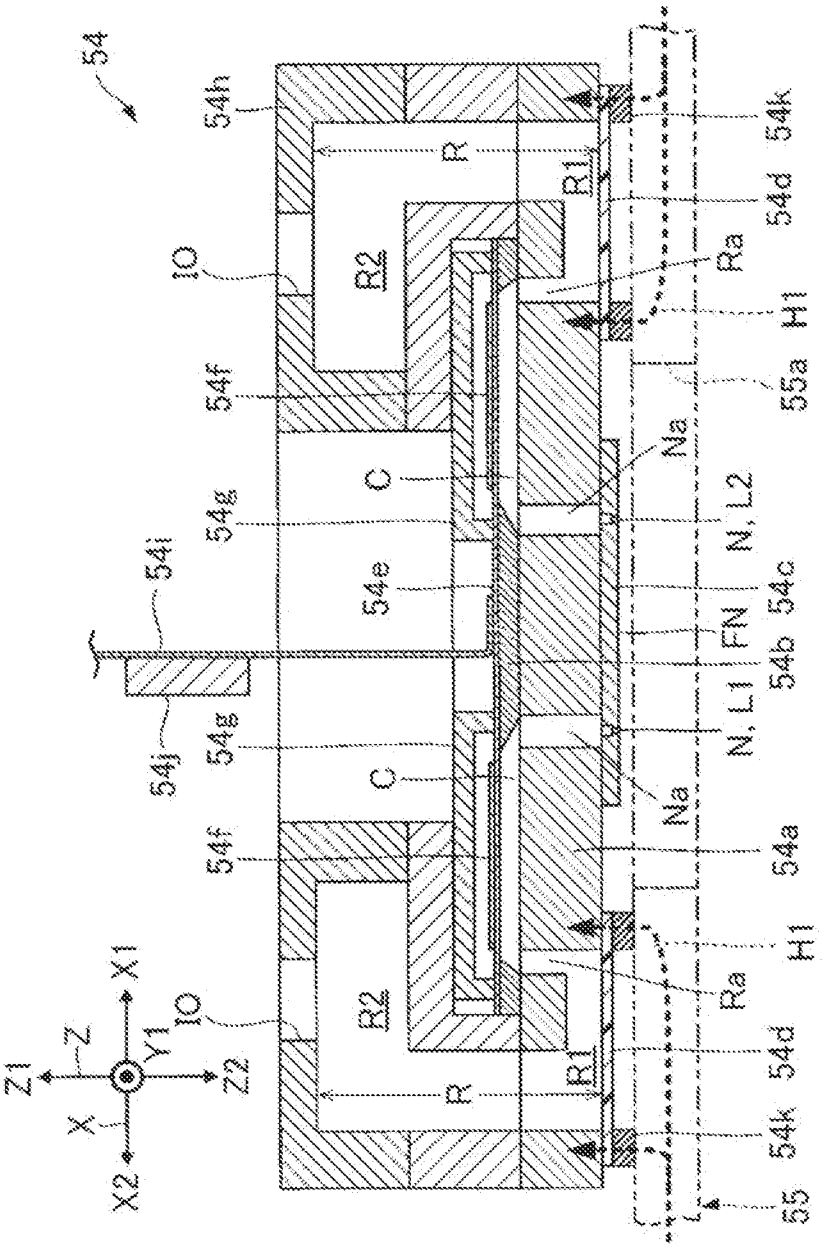
FIG. 6 is a cross-sectional view illustrating an example of a head chip.

FIG. 6 is a cross-sectional view illustrating an example of the head chip 54. As illustrated in FIG. 6, the head chip 54 has a plurality of nozzles N arranged in the direction along the Y axis. The nozzles N are divided into a first row L1 and a second row L2 arranged to be apart from each other in the direction along the X axis. Each of the first row L1 and the second row L2 is a set of the nozzles N arranged in a straight line in the direction along the Y axis.

The head chip 54 has a substantially symmetrical configuration in the direction along the X axis. However, the positions of the nozzles N in the first row L1 and the nozzles N in the second row L2 in the direction along the Y axis may be the same as or different from each other. Exemplified in FIG. 6 is a configuration in which the nozzles N in the first row L1 and the nozzles N in the second row L2 are at the same positions in the direction along the Y axis.

As illustrated in FIG. 6, the head chip 54 has a flow path substrate 54*a*, a pressure chamber substrate 54*b*, a nozzle plate 54*c*, a vibration absorber 54*d*, a diaphragm 54*e*, a plurality of piezoelectric elements 54*f*, a protective plate 54*g*, a case 54*h*, the wiring substrate 54*i*, and a drive circuit 54*j*.

The flow path substrate 54*a* and the pressure chamber substrate 54*b* are laminated in this order in the Z1 direction and form a flow path for ink supply to the nozzles N. The diaphragm 54*e*, the piezoelectric elements 54*f*, the protective plate 54*g*, the case 54*h*, the wiring substrate 54*i*, and the drive circuit 54*j* are installed in the region that is positioned in the Z1 direction beyond the laminate of the flow path substrate 54*a* and the pressure chamber substrate 54*b*. The nozzle plate 54*c* and the vibration absorber 54*d* are installed in the region that is positioned in the Z2 direction beyond the laminate. Schematically, each element of the head chip 54 is a plate-shaped member that is elongated in the Y direction. The elements are joined together by means of, for example, an adhesive. Hereinafter, the elements of the head chip 54 will be described in order.

The nozzle plate 54*c* is a plate-shaped member provided with the respective nozzles N in the first row L1 and the second row L2. Each of the nozzles N is a through hole through which ink is passed. Here, the surface of the nozzle plate 54*c* that faces the Z2 direction is the nozzle surface FN. In other words, the normal direction of the nozzle surface FN is the direction of the normal vector of the nozzle surface FN and is the Z2 direction (ejection direction). The nozzle plate 54*c* is manufactured by, for example, processing a silicon single crystal substrate by a semiconductor manufacturing technique using a processing technique such as dry etching and wet etching. Alternatively, another known method and another known material may be appropriately used in manufacturing the nozzle plate 54*c*. The cross-sectional shape of the nozzle is typically circular, the shape is not limited thereto, and the shape may be a non-circular shape such as polygonal and elliptical shapes.

The flow path substrate 54*a* is provided with a space R1, a plurality of supply flow paths Ra, and a plurality of communication flow paths Na for each of the first row L1 and the second row L2. The space R1 is an elongated opening extending in the direction along the Y axis in a plan view in the direction along the Z axis. Each of the supply flow path Ra and the communication flow path Na is a through hole formed for each nozzle N. Each supply flow path Ra communicates with the space R1.

The pressure chamber substrate 54*b* is a plate-shaped member provided with a plurality of pressure chambers C called cavities for each of the first row L1 and the second row L2. The pressure chambers C are arranged in the direction along the Y axis. Each pressure chamber C is an elongated space formed for each nozzle N and extending in the direction along the X axis in a plan view. As in the case of the nozzle plate 54*c* described above, each of the flow path substrate 54*a* and the pressure chamber substrate 54*b* is manufactured by, for example, processing a silicon single crystal substrate by a semiconductor manufacturing technique. Alternatively, another known method and another known material may be appropriately used in manufacturing each of the flow path substrate 54*a* and the pressure chamber substrate 54*b*.

The pressure chamber C is a space positioned between the flow path substrate 54*a* and the diaphragm 54*e*. The pressure chambers C are arranged in the direction along the Y axis for each of the first row L1 and the second row L2. In addition, the pressure chamber C communicates with each of the communication flow path Na and the supply flow path Ra. Accordingly, the pressure chamber C communicates with the nozzle N via the communication flow path Na and communicates with the space R1 via the supply flow path Ra.

The diaphragm 54*e* is disposed on the surface of the pressure chamber substrate 54*b* that faces the Z1 direction. The diaphragm 54*e* is a plate-shaped member that is capable of elastically vibrating. The diaphragm 54*e* has, for example, a first layer and a second layer, which are laminated in the Z1 direction in this order. The first layer is, for example, an elastic film made of silicon oxide ($SiO_2$) The elastic film is formed by, for example, thermally oxidizing one surface of a silicon single crystal substrate. The second layer is, for example, an insulating film made of zirconium oxide ($ZrO_2$)

The insulating film is formed by, for example, forming a zirconium layer by a sputtering method and thermally oxidizing the layer. The diaphragm 54*e* is not limited to the configuration resulting from the lamination of the first and second layers. For example, the diaphragm 54*e* may be configured by a single layer or three or more layers.

On the surface of the diaphragm 54*e* that faces the Z1 direction, the piezoelectric elements 54*f* mutually corresponding to the nozzles N are disposed as drive elements for each of the first row L1 and the second row L2. Each piezoelectric element 54*f* is a passive element deformed by drive signal supply. Each piezoelectric element 54*f* has an elongated shape extending in the direction along the X axis in a plan view. The piezoelectric elements 54*f* are arranged in the direction along the Y axis so as to correspond to the pressure chambers C. The piezoelectric element 54*f* overlaps the pressure chamber C in a plan view.

Each piezoelectric element 54*f* has a first electrode (not illustrated), a piezoelectric layer (not illustrated), and a second electrode (not illustrated), which are laminated in the Z1 direction in this order. One of the first and second electrodes is an individual electrode disposed so as to be mutually separated for each piezoelectric element 54*f*, and a drive signal is applied to the electrode. The other of the first and second electrodes is a band-shaped common electrode extending in the direction along the Y axis so as to be continuous over the piezoelectric elements 54*f*, and a predetermined reference potential is supplied to the electrode. Examples of the metal material of the electrodes include metal materials such as platinum (Pt), aluminum (Al), nickel (Ni), gold (Au), and copper (Cu). One of the materials can be used alone or two or more can be used in combination in the form of an alloy, lamination, or the like. The piezoelectric layer is made of a piezoelectric material such as lead zirconate titanate ($Pb(Zr, Ti)O_3$). The piezoelectric layer forms, for example, a band shape extending in the direction along the Y axis so as to be continuous over the piezoelectric elements 54*f*. Alternatively, the piezoelectric layer may be integrated over the piezoelectric elements 54*f*. As for the piezoelectric layer in this case, a through hole penetrating the piezoelectric layer is provided, so as to extend in the direction along the X axis, in the region that corresponds in a plan view to the gap between the pressure chambers C adjacent to each other. When the diaphragm 54*e* vibrates in conjunction with the above deformation of the piezoelectric element 54*f*, the pressure in the pressure chamber C fluctuates and ink is ejected from the nozzle N as a result. A heat-generating element heating the ink in the pressure chamber C may replace the piezoelectric element 54*f* as a drive element.

The protective plate 54*g* is a plate-shaped member installed on the surface of the diaphragm 54*e* that faces the Z1 direction, protects the piezoelectric elements 54*f*, and reinforces the mechanical strength of the diaphragm 54*e*. Here, the piezoelectric elements 54*f* are accommodated between the protective plate 54*g* and the diaphragm 54*e*. The protective plate 54*g* is made of, for example, a resin material.

The case 54*h* is a case for storing ink supplied to the pressure chambers C. The case 54*h* is made of, for example, a resin material. The case 54*h* is provided with a space R2 for each of the first row L1 and the second row L2. The space R2 communicates with the space R1 and functions together with the space R1 as a reservoir R storing ink supplied to the pressure chambers C. The case 54*h* is provided with an introduction port 10 for ink supply to each reservoir R. The ink in each reservoir R is supplied to the pressure chamber C via each supply flow path Ra.

The vibration absorber 54*d* is also called a compliance substrate, is a flexible resin film constituting the wall surface of the reservoir R, and absorbs the pressure fluctuation of the ink in the reservoir R. The vibration absorber 54*d* may be a metallic and flexible thin plate. The surface of the vibration absorber 54*d* that faces the Z1 direction is joined to the flow path substrate 54*a* by means of, for example, an adhesive. A frame body 54*k* is joined to the surface of the vibration absorber 54*d* that faces the Z2 direction by means of, for example, an adhesive. The frame body 54*k* is a frame-shaped member that is along the outer periphery of the vibration absorber 54*d* and comes into contact with the fixing plate 55. Here, the frame body 54*k* is made of a metal material such as stainless steel, aluminum, titanium, and a magnesium alloy. By configuring the frame body 54*k* by means of a metal material as described above, the heat from the heater 56 can be suitably transferred to the ink in the head chip 54 via the holder 53 and the fixing plate 55. In FIG. 6, a transfer path H1 of the heat from the heater 56 to the head chip 54 is schematically indicated by a dashed arrow. Although a part of the transfer path H1 includes the vibration absorber 54*d* made of resin, which is a material having a relatively low level of thermal conductivity, the vibration absorber 54*d* is flexible and thus is thin and very small in thermal resistance by being formed in a film shape. Accordingly, the effect of the heat conduction from the frame body 54*k* to the flow path substrate 54*a* being inhibited by the vibration absorber 54*d* is small.

The wiring substrate 54*i*, which is mounted on the surface of the diaphragm 54*e* that faces the Z1 direction, is a mounting component for electrically coupling the control unit 20 and the head chip 54. The wiring substrate 54*i* is a flexible wiring substrate such as a chip on film (COF), a flexible printed circuit (FPC), and a flexible flat cable (FFC). The drive circuit 54*j* for drive voltage supply to each piezoelectric element 54*f* is mounted on the wiring substrate 54*i* of the present embodiment. The drive circuit 54*j* performs switching based on the control signal S as to whether or not to supply at least a part of the waveform in the drive signal D as a drive pulse.

1-5. Configuration of Holder

Figure 7:
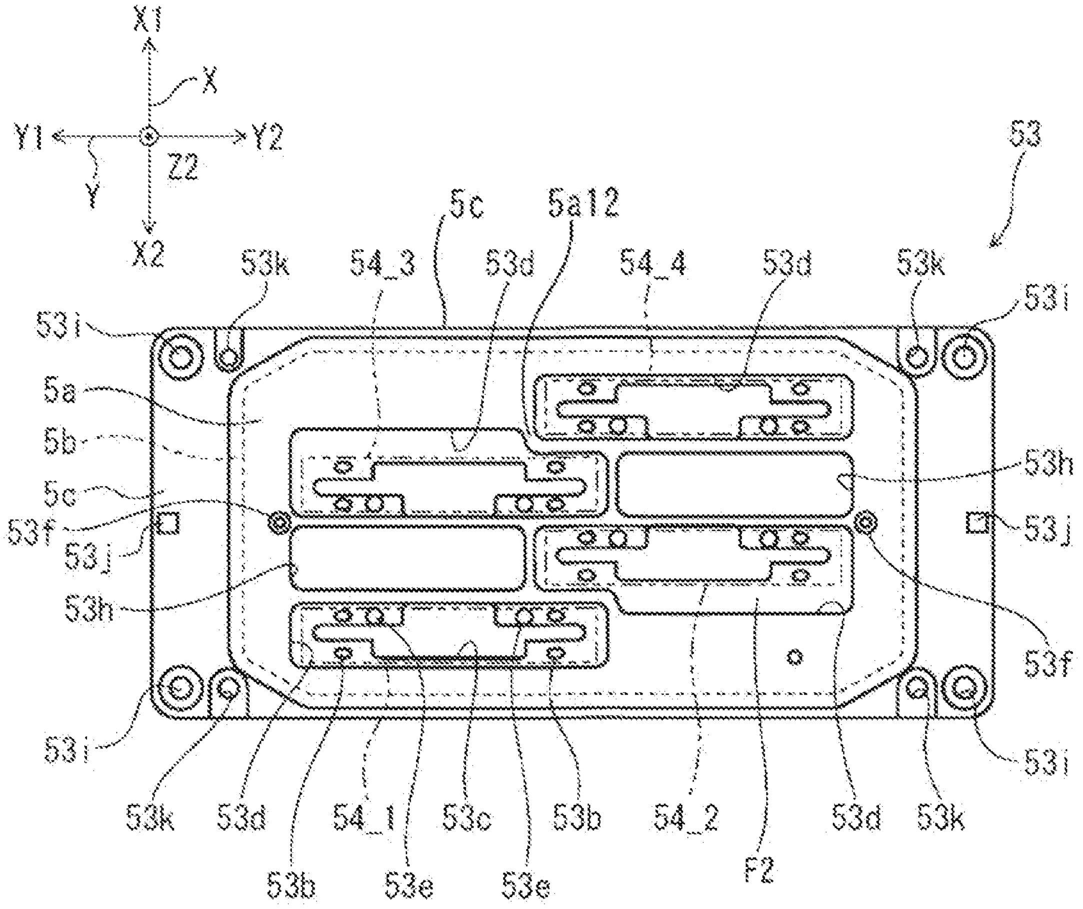
FIG. 7 is a bottom view of a holder in the first embodiment.
Figure 8:
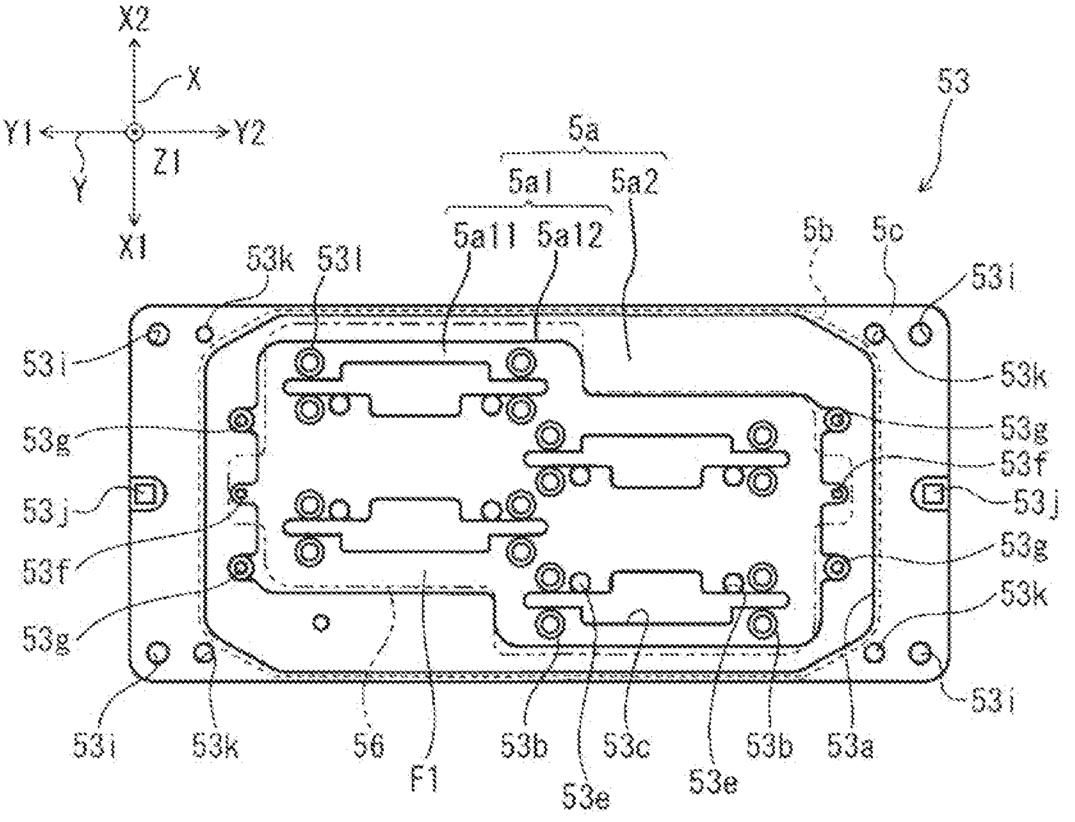
FIG. 8 is a top view of the holder in the first embodiment.

FIG. 7 is a bottom view in which the holder 53 in the first embodiment is viewed in the Z1 direction. FIG. 8 is a top view in which the holder 53 in the first embodiment is viewed in the Z2 direction. As illustrated in FIGS. 7 and 8, the holder 53 having a substantially tray shape as described above has a bottom portion 5*a*, the outer wall portion 5*b*, and a flange portion 5*c*.

The bottom portion 5*a* has a substantially plate shape extending in a direction orthogonal to the Z axis and constitutes the bottom surface of the recess 53*a*. Here, the bottom portion 5*a* is divided into a holding portion Sal and a coupling portion 5*a*2 disposed so as to surround the outer periphery of the holding portion Sal and thinner than the holding portion 5*a*1.

The holding portion Sal has the four recesses 53*d* described above and holds the four head chips 54. Each head chip 54 is accommodated in the space that is surrounded between each recess 53*d* and the fixing plate 55. In addition, as illustrated in FIG. 7, the holding portion Sal is provided with two recesses 53*h* in addition to the four recesses 53*d*. Each recess 53*h* is a recess for so-called lightening, disposed between the four recesses 53*d*, and similar in depth to the recess 53*d*. The holding portion 5*a*1 has a heat receiving portion 5*a*11 and a side wall portion 5*a*12.

The heat receiving portion 5*a*11 has a plate shape having the first surface F1 and a second surface F2 extending in a direction orthogonal to the Z axis and constitutes the bottom surfaces of the recess 53*d* and the recess 53*h*. The first surface F1, which faces the Z1 direction, is a heat receiving surface receiving the heat from the heater 56. The flow path structure 51 is placed on the first surface F1 via the heater 56 and the heat transfer member 57 described above. The second surface F2 faces the Z2 direction and constitutes the bottom surfaces of the recess 53*d* and the recess 53*h*.

In the example illustrated in FIGS. 7 and 8, the ink holes 53*b* and the wiring holes 53*c* are provided in the heat receiving portion 5*a*11 so as to open in the first surface F1 and the second surface F2, respectively. In addition, the first surface F1 of the heat receiving portion 5*a*11 is provided with a plurality of holes 53*e*, a plurality of holes 53*f*, and a plurality of screw holes 53*g*.

The holes 53*e* are used in positioning the head chip 54 with respect to the holder 53 by inserting a protrusion (not illustrated) provided on the head chip 54. The holes 53*f* are holes for inserting positioning pins used in positioning the flow path structure 51, the heater 56, and the heat transfer member 57. The screw holes 53*g* are used in screwing the heat transfer member 57. The screw holes 53*g* are used in screwing the flow path structure 51.

The side wall portion 5*a*12 protrudes in the Z2 direction from the heat receiving portion 5*a*11 and constitutes the side surfaces of the recess 53*d* and the recess 53*h*. The coupling portion 5*a*2 is coupled to the end of the side wall portion 5*a*12 in the Z2 direction. Here, when viewed in the direction along the Z axis, the shape of the side wall portion 5*a*12 is the shape of the heat receiving portion 5*a*11 from which the shapes of the recesses 53*d* and the recesses 53*h* are removed. In other words, the side wall portion 5*a*12 that is viewed in the direction along the Z axis includes a partition wall between the adjacent recesses 53*d*, a partition wall between the adjacent recesses 53*d* and 53*h*, and an outer peripheral wall surrounding the recesses 53*d* and the recesses 53*h*.

The coupling portion 5*a*2 is disposed so as to surround the holding portion Sal when viewed in the direction along the Z axis. The coupling portion 5*a*2 has a plate shape extending from the side wall portion 5*a*12 in a direction orthogonal to the Z axis and couples the side wall portion 5*a*12 and the outer wall portion 5*b* over the entire circumference. The coupling portion 5*a*2 may have a shape having a defective part or may be configured by a plurality of parts arranged at intervals in the circumferential direction.

The outer wall portion 5*b*, which constitutes the side surface of the recess 53*a* described above, has a frame shape extending in the Z1 direction over the entire circumference from the peripheral edge of the bottom portion 5*a*.

The flange portion 5*c* has a plate shape protruding outward in a direction orthogonal to the Z axis from the end of the outer wall portion 5*b* in the Z1 direction. In this manner, the outer peripheral edge of the coupling portion 5*a*2 of the bottom portion 5*a* is coupled via the outer wall portion 5*b* to the inner peripheral edge of the flange portion 5*c*. In the example illustrated in FIGS. 7 and 8, the flange portion 5*c* has a rectangular or substantially rectangular shape in a plan view. Accordingly, the holder 53 has a rectangular or substantially rectangular outer shape in a plan view. The flange portion 5*c* is provided with a plurality of holes 53*j* as well as the screw holes 53*i* and the screw holes 53*k*. The holes 53*j* are used in positioning the holder 53 with respect to the support body 41 by inserting a protrusion (not illustrated) provided on the support body 41.

1-6. Shape of Holding Portion of Holder

Figure 9:
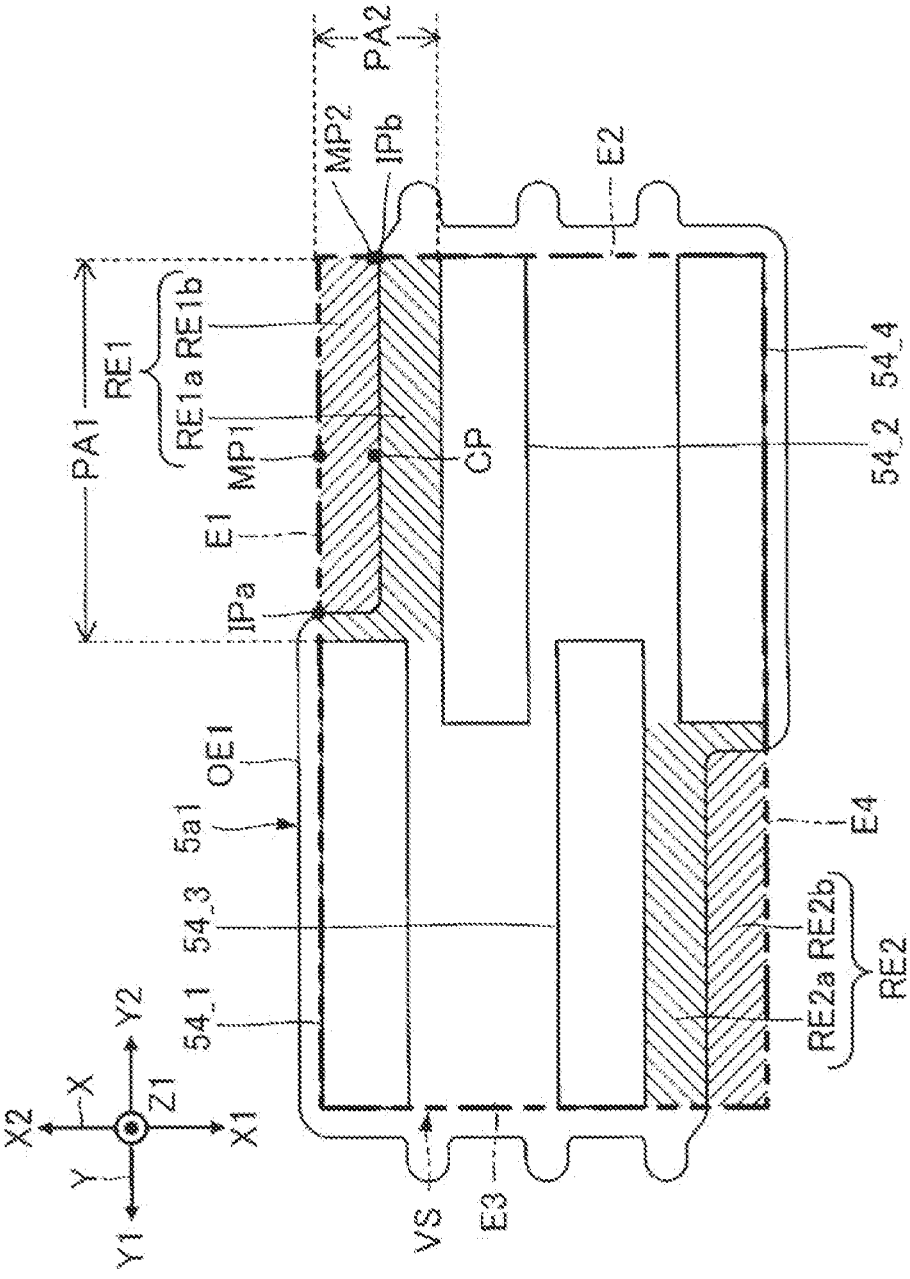
FIG. 9 is a diagram illustrating the shape of a holding portion of the holder in the first embodiment.

FIG. 9 is a diagram illustrating the shape of the holding portion 5*a*1 of the holder 53 in the first embodiment. In FIG. 9, the outer shapes of the holding portion 5*a*1 and the head chips 54 that are viewed in the Z2 direction are indicated by solid lines for convenience of description.

As illustrated in FIG. 9, an outer edge OE1 of the holding portion 5*a*1 has a shape corresponding to the disposition of the head chips 54_1, 54_2, 54_3, and 54_4 in a plan view in the direction along the Z axis. In other words, the outer edge OE1 in a plan view has a shape in which a pair of diagonal corners constituting the four corners of a rectangle and parts in the vicinity thereof are notched in a substantially rectangular shape. Hereinafter, the disposition of the head chips 54_1, 54_2, 54_3, and 54_4 and the shape of the outer edge OE1 of the holding portion 5*a*1 in a plan view will be described in detail in order.

As illustrated in FIG. 9, the head chip 54_1, the head chip 54_2, the head chip 54_3, and the head chip 54_4 are staggered in a plan view. The head chip 54_1 and the head chip 54_2 are adjacent to each other, the head chip 54_2 and the head chip 54_3 are adjacent to each other, and the head chip 54_3 and the head chip 54_4 are adjacent to each other.

Specifically, the head chip 54_1, the head chip 54_2, the head chip 54_3, and the head chip 54_4 are arranged in this order in the X1 direction. The head chip 54_1 and the head chip 54_3 are disposed at positions misaligned in the Y1 direction with respect to the head chip 54_2 and the head chip 54_4. Here, the head chip 54_1 and the head chip 54_3 are disposed side by side in the direction along the X axis such that the mutual positions in the direction along the Y axis are aligned. Likewise, the head chip 54_2 and the head chip 54_4 are disposed side by side in the direction along the X axis such that the mutual positions in the direction along the Y axis are aligned. In addition, in a plan view, each head chip 54 has a rectangular or substantially rectangular shape extending in the direction along the Y axis.

In FIG. 9, a virtual rectangle VS circumscribing the aggregate of the head chips 54_1, 54_2, 54_3, and 54_4 disposed as described above in a plan view is indicated by a two-dot chain line. The rectangle VS is the smallest rectangle that includes the aggregate in a plan view. In addition, in the present embodiment, each of the head chips 54_1, 54_2, 54_3, and 54_4 is in contact with the virtual rectangle VS. In the example illustrated in FIG. 9, the aggregate has a shape that is symmetrical twice in a plan view.

The outer edge OE1 of the holding portion 5*a*1 has a part positioned inside the rectangle VS and a part positioned outside the rectangle VS.

Here, when the four sides of the rectangle VS are a first side E1, a second side E2, a third side E3, and a fourth side E4, the head chip 54_1 is in contact with the first side E1 and the third side E3 in a plan view. The head chip 54_2 is in contact with the second side E2 in a plan view. The head chip 54_3 is in contact with the third side E3 in a plan view. The head chip 54_4 is in contact with the second side E2 and the fourth side E4 in a plan view.

The first side E1 is one of the four sides of the rectangle VS. The second side E2 is coupled to one end of the first side E1, which is one of the four sides of the rectangle VS. The third side E3 is coupled to the other end of the first side E1, which is one of the four sides of the rectangle VS. The fourth side E4 is the side of the rectangle VS other than the first side E1, the second side E2, and the third side E3.

A first region RE1 surrounded by the first side E1, the second side E2, the head chip 54_1, and the head chip 54_2 in a plan view is divided into a first inside part RE1*a* and a first outside part RE1*b* by the outer edge OE1. The first inside part RE1*a* is the part of the first region RE1 that is positioned inside the outer edge OE1. The first outside part RE1*b* is the part of the first region RE1 that is positioned outside the outer edge OE1. The first region RE1, which is rectangular, is surrounded by the first side E1, the second side E2, a straight line along the short side that is one of the two short sides of the head chip 54_1 and closer to the head chip 54_2, and a straight line along the long side that is one of the two long sides of the head chip 54_2 and closer to the head chip 54_1 in a plan view.

Here, the first side E1 has a first part PA1 defining the first region RE1. The first part PA1 is one of the four sides constituting the rectangular first region RE1 and belongs to the first side E1. The second side E2 has a second part PA2 defining the first region RE1. The second part PA2 is one of the four sides constituting the rectangular first region RE1 and belongs to the second side E2. In a plan view, the outer edge OE1 of the holding portion 5*a*1 intersects with both the first part PA1 and the second part PA2.

In a plan view, an intersection IPa between the outer edge OE1 of the holding portion 5*a*1 and the first part PA1 is positioned closer to the head chip 54_1 than a midpoint MP1 of the first part PA1 and an intersection IPb between the outer edge OE1 of the holding portion 5*a*1 and the second part PA2 is positioned closer to the head chip 54_2 than a midpoint MP2 of the second part PA2. In the example illustrated in FIG. 9, the intersection IPb is positioned very close to the midpoint MP2 and yet positioned in the X1 direction with respect to the midpoint MP2.

Further, a center CP of the first region RE1 is positioned outside the outer edge OE1 of the holding portion 5*a*1 in a plan view. In other words, the center CP of the first region RE1 is not included inside the outer edge OE1 of the holding portion 5*a*1. In the example illustrated in FIG. 9, the center CP is positioned very close to the outer edge OE1 and yet positioned outside the outer edge OE1.

As in the case of the first region RE1 described above, a second region RE2 surrounded by the third side E3, the fourth side E4, the head chip 54_3, and the head chip 54_4 in a plan view is divided into a second inside part RE2*a* and a second outside part RE2*b* by the outer edge OE1. The second inside part RE2*a* is positioned inside the outer edge OE1. The second outside part RE2*b* is positioned outside the outer edge OE1. The second region RE2, which is rectangular, is surrounded by the third side E3, the fourth side E4, a straight line along the long side that is one of the two long sides of the head chip 54_3 and closer to the head chip 54_4, and a straight line along the short side that is one of the two short sides of the head chip 54_4 and closer to the head chip 54_3 in a plan view.

1-7. Shape of Heater

Figure 10:
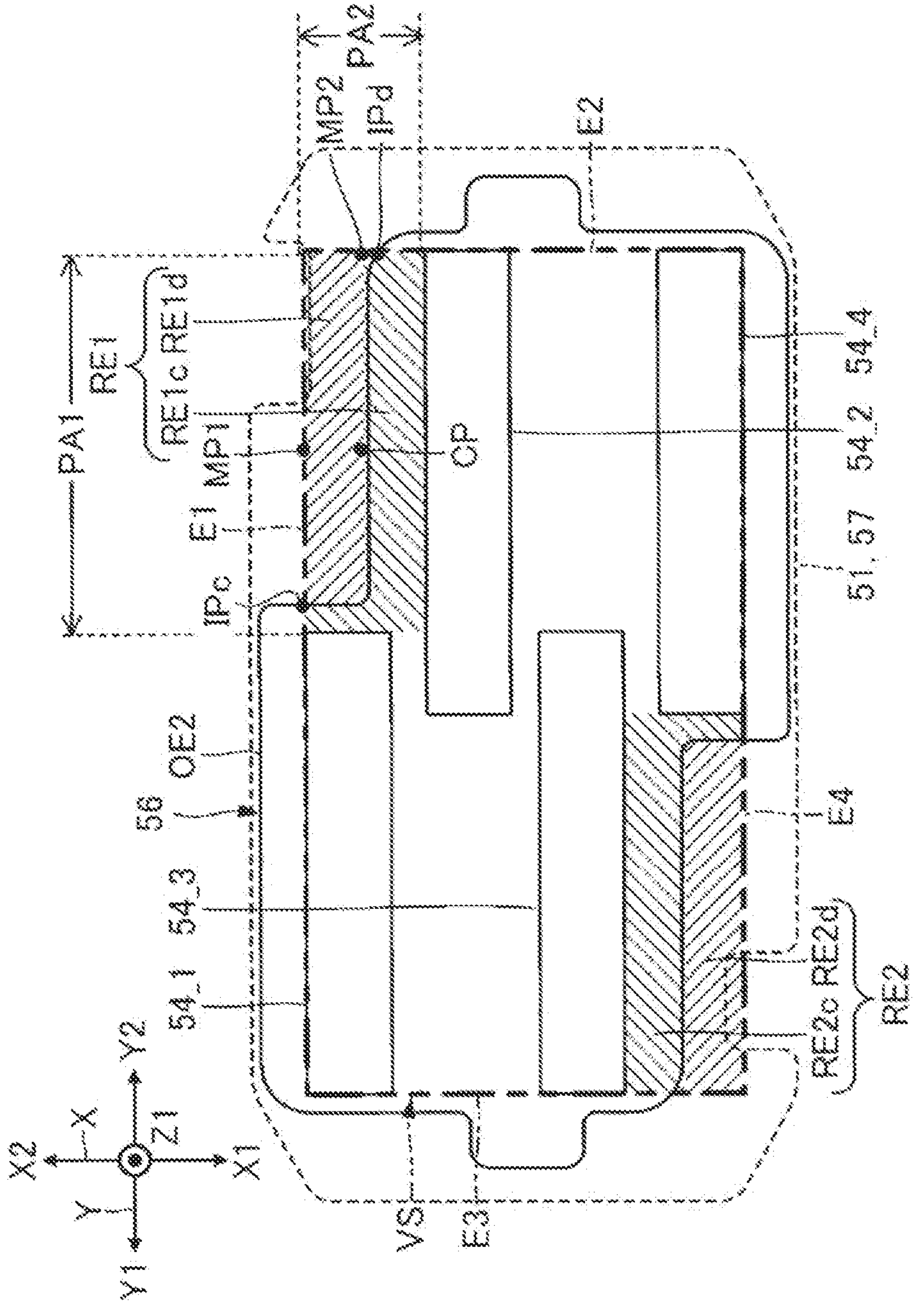
FIG. 10 is a diagram illustrating the shapes of a heater and a heat transfer member in the first embodiment.

FIG. 10 is a diagram illustrating the shapes of the heater 56 and the heat transfer member 57 in the first embodiment. In FIG. 10, the outer shapes of the heater 56 and the head chips 54 that are viewed in the Z2 direction are indicated by solid lines for convenience of description. In addition, in FIG. 10, the outer shape of the flow path structure 51 or the heat transfer member 57 that is viewed in the Z2 direction is indicated by a dashed line.

As illustrated in FIG. 10, in a plan view in the direction along the Z axis, an outer edge OE2 of the heater 56 has a shape corresponding to the disposition of the head chips 54_1, 54_2, 54_3, and 54_4. The outer edge OE2 in the present embodiment is schematically identical in shape to the outer edge OE1 of the holding portion Sal, which is illustrated in FIG. 8. In other words, it can be said that the outer edge OE2 has a shape along the outer edge OE1. Hereinafter, the shape of the outer edge OE2 of the heater 56 in a plan view will be described in detail in order.

In FIG. 10, the virtual rectangle VS is indicated by a two-dot chain line. The outer edge OE2 of the heater 56 has a part positioned inside the rectangle VS and a part positioned outside the rectangle VS as in the case of the outer edge OE1 of the holding portion 5*a*1.

In a plan view, the first region RE1 is divided into a first inside part RE1*c* and a first outside part RE1*d* by the outer edge OE2. The first inside part RE1*c* is the part of the first region RE1 that is positioned inside the outer edge OE2. The first outside part RE1*d* is the part of the first region RE1 that is positioned outside the outer edge OE2. As described above, the outer edge OE2 in the present embodiment is schematically identical in shape to the outer edge OE1 of the holding portion 5*a*1. Accordingly, the first inside part RE1*c* is substantially identical to the first inside part RE1*a* and the first outside part RE1*d* is substantially identical to the first outside part RE1*b*.

In a plan view, the outer edge OE2 of the heater 56 includes the head chips 54 and intersects with both the first part PA1 and the second part PA2. In addition, in a plan view, an intersection IPc between the outer edge OE2 of the heater 56 and the first part PA1 is positioned closer to the head chip 54_1 than the midpoint MP1 of the first part PA1 and an intersection IPd between the outer edge OE2 of the heater 56 and the second part PA2 is positioned closer to the head chip 54_2 than the midpoint MP2 of the second part PA2. In the example illustrated in FIG. 10, the intersection IPd is positioned very close to the midpoint MP2 and yet positioned in the X1 direction with respect to the midpoint MP2.

The center CP of the first region RE1 is positioned outside the outer edge OE2 in a plan view. In other words, the center CP of the first region RE1 is not included inside the outer edge OE2 of the heater 56. In the example illustrated in FIG. 10, the center CP is positioned very close to the outer edge OE2 and yet positioned outside the outer edge OE2.

As in the case of the first region RE1, the second region RE2 is divided into a second inside part RE2*c* and a second outside part RE2*d* by the outer edge OE2 in a plan view. The second inside part RE2*c* is positioned inside the outer edge OE2. The second outside part RE2*d* is positioned outside the outer edge OE2. In the present embodiment, the second inside part RE2*c* is substantially identical to the second inside part RE2*a* and the second outside part RE2*d* is substantially identical to the second outside part RE2*b*.

In a plan view, the heat transfer member 57 indicated by a dashed line in FIG. 10 not only includes the head chips 54_1, 54_2, 54_3, and 54_4 but also overlaps at least a part of each of the first outside part RE1*d* and the second outside part RE2*d*. Likewise, although not illustrated, the heat transfer member 57 overlaps at least a part of each of the first outside part RE1*b* and the second outside part RE2*b* illustrated in FIG. 9 in a plan view.

Here, the plan-view shape of the heat transfer member 57 is substantially identical to the plan-view shape of the flow path structure 51. Accordingly, in a plan view, the flow path structure 51 overlaps at least a part of each of the first outside part RE1*d* and the second outside part RE2*d*. Likewise, although not illustrated, the flow path structure 51 overlaps at least a part of each of the first outside part RE1*b* and the second outside part RE2*b* illustrated in FIG. 9 in a plan view.

1-8. Transfer Path of Heat from Heater

FIG. 11 is a diagram illustrating the transfer path H1 and a transfer path H2 of the heat from the heater 56 in the first embodiment. In FIG. 11, each of the transfer path H1 and the transfer path H2 is schematically indicated by a dashed line.

As described above, the support body 41 is provided with the opening 41*a* into which the outer wall portion 5*b* is inserted. The flange portion 5*c* has an attachment surface 5*c*1 facing the Z2 direction, which is the normal direction of the nozzle surface FN. The holder 53 is attached to the support body 41 in a state where the outer wall portion 5*b* is inserted in the opening 41*a* with the outer wall portion 5*b* and the support body 41 having a gap d1 therebetween and the attachment surface 5*c*1 is in contact with the support body 41.

As described above, the heater 56 heats each head chip 54 by transferring heat to each head chip 54 through the transfer path H1.

The heat from the heater 56 is partially transferred to the support body 41 via the holder 53. In other words, some of the heat from the heater 56 escapes to the support body 41 via the holder 53 without being used for heating each head chip 54. This heat escape results in not only a decline in the efficiency of the heating of each head chip 54 by the heater 56 but also a variation in the temperature distribution in each head chip 54 or between the head chips 54.

In order to reduce the heat escape, the holder 53 has a configuration for increasing the thermal resistance in the transfer path H2 of the heat from the heater 56 to the support body 41. Specifically, in the holder 53, the heat receiving portion 5*a*11 and the flange portion 5*c* are coupled via the side wall portion 5*a*12, the coupling portion 5*a*2, and the outer wall portion 5*b* as described above.

The transfer path H2 is a path where heat is transferred to the heat receiving portion 5*a*11, the side wall portion 5*a*12, the coupling portion 5*a*2, the outer wall portion 5*b*, and the flange portion 5*c* in this order. Each of the coupling portion 5*a*2 and the flange portion 5*c* extends in a direction intersecting with the Z axis whereas each of the side wall portion 5*a*12 and the outer wall portion 5*b* extends in the direction along the Z axis. Accordingly, the transfer path H2 is bent or curved at two or more points between the heat receiving portion 5*a*11 and the flange portion 5*c* when viewed in a cross section as illustrated in FIG. 11. The regions surrounded by the two-dot chain lines in FIG. 11 are the two points where the transfer path H2 is bent or curved.

Here, the outer peripheral surface of the side wall portion 5*a*12 is disposed with a gap d3 formed over the entire area with respect to the inner peripheral surface of the outer wall portion 5*b*. Accordingly, the heat transfer from the side wall portion 5*a*12 to the outer wall portion 5*b* passes through the coupling portion 5*a*2 without being directly performed therebetween. In addition, the flow path structure 51 is disposed with the gap d2 formed between the flow path structure 51 and the outer wall portion 5*b*. Accordingly, the heat transfer from the heat receiving portion 5*a*11 to the outer wall portion 5*b* does not pass through the flow path structure 51.

As described above, the liquid ejecting head 50 includes the head chips 54, the thermally conductive holder 53, the thermally conductive flow path structure 51, and the planar heater 56. Each of the head chips 54 has the nozzle surface FN provided with the nozzle N ejecting ink, which is an example of "liquid". The holder 53 holds the head chips 54. The flow path structure 51 is provided with a flow path of the ink that is supplied to the head chips 54. The heater 56 is disposed between the holder 53 and the flow path structure 51 and is along the direction that is parallel to the nozzle surface FN. In addition, the heater 56 overlaps the head chips 54 in a plan view.

In the liquid ejecting head 50, the heater 56 is disposed between the holder 53 and the flow path structure 51. Accordingly, the heat from the heater 56 can be efficiently transferred to each of the holder 53 and the flow path structure 51 as compared with the configuration of the related art in which the flow path structure 51 is interposed between the heater 56 and the holder 53. As a result, it is possible to reduce the temperature difference between the holder 53 and the flow path structure 51 and, by extension, the temperature difference between the head chip 54 and the flow path structure 51. In addition, the heater 56 has a planar shape along the direction parallel to the nozzle surface and overlaps the head chips 54 in a plan view. Accordingly, the heat from the heater 56 can be efficiently transferred to each of the head chips 54 as compared with a configuration in which the heater 56 overlaps only some of the head chips 54 in a plan view. As a result, the temperature difference between the head chips 54 can be reduced. From the above, it is possible to manage the temperature of the head chip 54 with high accuracy by controlling the temperature of the heater 56.

As described above, the holder 53 in the present embodiment has the holding portion 5*a*1 holding the head chips 54. The holding portion 5*a*1 includes the head chips 54 in a plan view. Accordingly, the heat from the heater 56 can be transferred to the head chips 54 via the single holding portion 5*a*1. As a result, there is no need to provide the heater 56 for each head chip 54 and the heater 56 can be installed with ease.

Each of the head chips 54 is elongated along the direction along the Y axis. In addition, the head chips 54 include the head chip 54_1 as an example of "first head chip" and the head chip 54_2 as an example of "second head chip". The head chip 54_1 and the head chip 54_2 are adjacent to each other. Here, the head chips being adjacent to each other means the positional relationship between the head chips 54 and a configuration other than the head chip 54 (for example, corresponding to the side wall portion 5*a*12 of the holder 53 in the present embodiment) may be interposed between the head chips 54. In addition, the head chip 54_1 and the head chip 54_3 are disposed to be offset from each other in the direction along the X axis and at the same position pertaining to the direction along the Y axis such that the end portion of the head chip 54_2 in the Y1 direction is interposed. However, in terms of positional relationship, the head chip 54_1 and the head chip 54_3 face each other in the direction along the X axis by at least half of the dimension of the head chip 54 pertaining to the direction along the Y axis. Accordingly, it can be said that the head chip 54_1 and head chip 54_3 are also adjacent to each other. The head chip 54_1 and the head chip 54_2 are disposed to be offset from each other in both the direction along the Y axis and the direction along the X axis. When the first and second directions are two directions intersecting with each other along the nozzle surface FN, the direction along the Y axis is an example of "first direction" and the direction along the X axis is an example of "second direction".

Here, the head chip 54_1 is in contact with the first side E1 and the third side E3 of the virtual rectangle VS in a plan view and the head chip 54_2 is in contact with the second side E2 in a plan view. The first region RE1 surrounded by the first side E1, the second side E2, the head chip 54_1, and the head chip 54_2 in a plan view includes the first outside part RE1*b* positioned outside the outer edge OE1 of the holding portion 5*a*1. The outer edge OE1 is the outer edge of the side wall portion 5*a*12 in a plan view.

As described above, the rectangle VS circumscribes the aggregate of the head chips 54 of the liquid ejecting head 50 in a plan view. The first side E1 is one of the four sides of the rectangle VS. The second side E2 is coupled to one end of the first side E1, which is one of the four sides of the rectangle VS. The third side E3 is coupled to the other end of the first side E1, which is one of the four sides of the rectangle VS.

The first outside part RE1*b* lacks the holding portion Sal and lacks the head chip 54. Accordingly, the presence of the first outside part RE1*b* means reducing a useless part other than the part of the holding portion Sal that should be heated. Accordingly, it is possible to reduce the heat from the heater 56 escaping to the useless part. As a result, the head chip 54 can be efficiently heated by the heater 56. This is also advantageous in that the area or power consumption of the heater 56 can be reduced.

As described above, the holder 53 is provided with the ink holes 53*b* and the ink holes 53*b* constitute a flow path of the ink that is supplied to the head chips 54. Accordingly, from the viewpoint of increasing the ink resistance of the holder 53 and efficiently transferring the heat from the heater 56 to the ink in the ink hole 53*b* via the holder 53, it is preferable that the holder 53 is made of stainless steel or ceramics.

In a plan view, the first region RE1 includes the first outside part RE1*d*, which does not overlap the heater 56. Accordingly, the area of the heater 56 can be reduced. The first outside part RE1*d* lacks the head chip 54_1 and lacks the head chip 54_2, and thus useless heat generation of the heater 56 can be reduced. As a result, the head chip 54 can be efficiently heated by the heater 56.

As described above, the liquid ejecting head 50 further includes the heat transfer member 57 as an example of "second heat transfer member". The heat transfer member 57 is disposed between the heater 56 and the flow path structure 51, is higher in thermal conductivity than the flow path structure 51, and is, for example, aluminum. In a plan view, each of the heat transfer member 57 and the flow path structure 51 overlaps the first outside part RE1*b*. Since the flow path structure 51 is at the first outside part RE1*b*, the degree of freedom can be increased in routing the flow path in the flow path structure 51. In addition, since the heat transfer member 57 is disposed between the heater 56 and the flow path structure 51, the heat from the heater 56 can be transferred to the flow path structure 51 after being spread in the plane direction by the second heat transfer member. In particular, even with the flow path structure 51 at a part of the first outside part RE1*b*, the heat transfer member 57 is also at the first outside part RE1*b*, and thus the heat from the heater 56 can be transferred to the part via the heat transfer member 57. As a result, it is possible to reduce a variation in the temperature distribution of the flow path structure 51 attributable to the heater 56.

As described above, from the viewpoint of increasing the ink resistance of the flow path structure 51 and efficiently transferring the heat from the heater 56 to the ink in the flow path structure 51, it is preferable that the flow path structure 51 is made of stainless steel or ceramics.

In the present embodiment, the head chips 54 include the head chip 54_3 as an example of "third head chip" and the head chip 54_4 as an example of "fourth head chip". The head chip 54_3 and the head chip 54_4 are disposed to be offset from each other in both the direction along the Y axis and the direction along the X axis.

Here, when the fourth side E4 is the side of the virtual rectangle VS other than the first side E1, the second side E2, and the third side E3, the head chip 54_3 is in contact with the third side E3 in a plan view and the head chip 54_4 is in contact with the second side E2 and the fourth side E4 in a plan view. The second region RE2 surrounded by the third side E3, the fourth side E4, the head chip 54_3, and the head chip 54_4 in a plan view includes the second outside part RE2*b* positioned outside the outer edge OE1 of the holding portion 5*al.*

As in the case of the first outside part RE1*b*, the second outside part RE2*b* lacks the holding portion 5*a*1 and lacks the head chip 54. Accordingly, the presence of the second outside part RE2*b* means reducing a useless part other than the part of the holding portion 5*a*1 that should be heated. Accordingly, it is possible to reduce the heat from the heater 56 escaping to the useless part. As a result, the head chip 54 can be efficiently heated by the heater 56. This is also advantageous in that the area or power consumption of the heater 56 can be reduced.

The area of the first outside part RE1*b* is preferably 25% or more of the area of the first region RE1 and more preferably 50% or more and 90% or less of the area of the first region RE1. By the area of the first outside part RE1*b* being within this range, the above useless part of the holding portion Sal can be suitably reduced. Assuming that the area of the first outside part RE1*b* is too small, the power consumption of the heater 56 tends to increase and the temperature distribution in each head chip 54 or between the head chips 54 tends to vary. Assuming that the area of the first outside part RE1*b* is too large, it is difficult to ensure a wall thickness that is necessary for the holding portion 5*a*1. In addition, the area of the second outside part RE2*b* is preferably 25% or more of the area of the second region RE2 as in the case of the relationship between the area of the first outside part RE1*b* and the first region RE1.

As described above, the heater 56 overlaps the head chips 54 in a plan view. In a plan view, the first region RE1 includes the first outside part RE1*d* positioned outside the outer edge OE2 of the heater 56.

The first outside part RE1*d* lacks the heater 56 and lacks the head chip 54. Accordingly, the presence of the first outside part RE1*d* means reducing the unnecessary part of the heater 56. Accordingly, it is possible to reduce a variation in the temperature distribution in each head chip 54 or between the head chips 54 attributable to heat generation at the unnecessary part. This is also advantageous in that the area or power consumption of the heater 56 can be reduced.

In a plan view, each of the heat transfer member 57 and the flow path structure 51 overlaps the first outside part RE1*d*. Since the flow path structure 51 is at the first outside part RE1*d*, the degree of freedom can be increased in routing the flow path in the flow path structure 51. In addition, even with the flow path structure 51 at a part of the first outside part RE1*d*, the heat transfer member 57 is also at the first outside part RE1*d*, and thus the heat from the heater 56 can be transferred to the part via the heat transfer member 57. As a result, it is possible to reduce a variation in the temperature distribution of the flow path structure 51 attributable to the heater 56. This is particularly useful in a configuration in which a part of the flow path in the flow path structure 51 overlaps the first outside part RE1*d* in a plan view.

As described above, in a plan view, the second region RE2 includes the second outside part RE2*d* positioned outside the outer edge OE2 of the heater 56.

As in the case of the first outside part RE1*d*, the second outside part RE2*d* lacks the heater 56 and lacks the head chip 54. Accordingly, the presence of the second outside part RE2*d* means reducing the unnecessary part of the heater 56. Accordingly, it is possible to reduce a variation in the temperature distribution in each head chip 54 or between the head chips 54 attributable to heat generation at the unnecessary part. This is also advantageous in that the area or power consumption of the heater 56 can be reduced.

The area of the first outside part RE1*d* is preferably 25% or more of the area of the first region RE1 and more preferably 50% or more and 90% or less of the area of the first region RE1. By the area of the first outside part RE1*d* being within this range, the unnecessary part of the heater 56 can be suitably reduced. Assuming that the area of the first outside part RE1*d* is too small, the power consumption of the heater 56 tends to increase and the temperature distribution in each head chip 54 or between the head chips 54 tends to vary. Assuming that the area of the first outside part RE1*d* is too large, it is difficult to uniformly transfer the heat from the heater 56 to the holding portion **5*a*1 depending on, for example, the size of the holding portion 5*a*1. Also in this respect, the temperature distribution in each head chip 54 or between the head chips 54** tends to vary. In addition, the area of the second outside part RE2*d* is preferably 25% or more of the area of the second region RE2 as in the case of the relationship between the area of the first outside part RE1*d* and the first region RE1.

As described above, the liquid ejecting head 50 is supported by the support body 41. Here, the holder 53 has not only the holding portion Sal but also the flange portion **5*c* coming into contact with the support body 41 at a position apart from the holding portion 5*a*1. The heater 56 heats the holding portion 5*a*1. The holding portion Sal has the heat receiving portion 5*a*11, which receives the heat from the heater 56**.

As for the transfer path H2, the shortest path of the heat transferred through the holder 53 from the heat receiving portion **5*a*11 to the flange portion 5*c* is bent or curved at two or more points. Here, being bent or curved means, for example, a state where the length of the side wall portion 5*a*12 along the transfer path H2 (that is, the length of the side wall portion 5*a*12 pertaining to the direction along the Z axis) and the length of the coupling portion 5*a*2 along the transfer path H2 (that is, the length of the coupling portion 5*a*2 pertaining to the direction along the Y axis) respectively exceed the thickness of the side wall portion 5*a*12 in the thickness direction (direction along the Y axis) and the thickness of the coupling portion 5*a*2 in the thickness direction (direction along the Z axis) in the case of being bent or curved between the side wall portion 5*a*12 and the coupling portion 5*a*2 as in the present embodiment. The same applies to being bent or curved between the coupling portion 5*a*2 and the outer wall portion 5*b* and a case of being bent or curved at parts other than the parts. "Shortest path from the heat receiving portion 5*a*1*l* to the flange portion 5*c*" does not include the path of the heat that moves in the heat receiving portion 5*a*1*l* and the flange portion 5*c*. More specifically, "shortest path from the heat receiving portion 5*a*1*l* to the flange portion 5*c*" is a part of the shortest path that is through the holder 53 from any position of the heat receiving portion 5*a*1*l* to the position of contact between the flange portion 5*c* and the support body 41 and the part does not include the path of the heat that moves in the heat receiving portion 5*a*1*l* and the flange portion 5*c*. Accordingly, the thermal resistance of the shortest path can be increased as compared with a configuration in which the shortest path from the heat receiving portion 5*a*11 to the flange portion 5*c* is in a straight line and a configuration in which the thickness of the coupling portion 5*a*2 is increased such that the surface of the coupling portion 5*a*2 facing the Z1 direction coincides with the first surface F1. Accordingly, it is possible to make it difficult for the heat from the heater 56 to be dissipated to the support body 41 via the flange portion 5*c*. As a result, the head chip 54 can be efficiently heated by the heater 56**.

As described above, the heater 56 is disposed at a position that is in the direction (Z1 direction) opposite to the normal direction of the nozzle surface FN (Z2 direction) with respect to the holding portion **5*a*1. The holding portion Sal further has the side wall portion 5*a*12 extending in the normal direction (Z2 direction) from the heat receiving portion 5*a*11. The heat receiving portion 5*a*11 and the side wall portion 5*a*12 form the recess 53*d*, which is an example of "space" accommodating the head chip 54. Accordingly, the head chip 54, the holder 53, and the heater 56** can be easily assembled so as to be laminated in this order.

The holder 53 further has the outer wall portion **5*b* coupled to the flange portion 5*c* and surrounding the side wall portion 5*a*12 when viewed in the normal direction and the coupling portion 5*a*2 coupling the side wall portion 5*a*12 and the outer wall portion 5*b*. The coupling portion 5*a*2 extends in a direction intersecting with the normal direction, and each of the side wall portion 5*a*12 and the outer wall portion 5*b* extends from the coupling portion 5*a*2** in the direction opposite to the normal direction.

In this manner, the holder 53 has the holding portion Sal holding the head chip 54, the flange portion **5*c* coming into contact with the support body 41 at a position apart from the holding portion Sal, the outer wall portion 5*b* coupled to the flange portion 5*c* and surrounding the holding portion Sal when viewed in the normal direction of the nozzle surface FN, and the coupling portion 5*a*2 coupling the holding portion Sal and the outer wall portion 5*b*. The holding portion Sal protrudes from the coupling portion 5*a*2 in the direction opposite to the normal direction, and the outer wall portion 5*b* extends from the coupling portion 5*a*2 toward the flange portion 5*c*** in the direction opposite to the normal direction.

By the holder 53 being configured as described above, the shortest path that constitutes the transfer path H2 and is from the heat receiving portion **5*a*11 to the flange portion 5*c* has a point bent or curved by the coupling between the side wall portion 5*a*12 and the coupling portion 5*a*2 and a point bent or curved by the coupling between the outer wall portion 5*b* and the coupling portion 5*a*2. In other words, in the shortest path that constitutes the transfer path H2 and is from the heat receiving portion 5*a*11 to the flange portion 5*c*, the heat transfer direction in the side wall portion 5*a*12 and the heat transfer direction in the outer wall portion 5*b*** are opposite to each other.

As described above, the outer wall portion **5*b* surrounds the holding portion 5*a*1 at a distance from the holding portion 5*a*1 in a plan view. Accordingly, it is possible to easily realize the transfer path H2, which is bent or curved at two or more points as described above between the heat receiving portion 5*a*11 and the flange portion 5*c***.

As described above, the flange portion **5*c* is disposed at a position in the direction opposite to the normal direction of the nozzle surface FN beyond the heat receiving portion 5*a*11. Accordingly, the length of the outer wall portion 5*d*** pertaining to the direction along the Z axis can be increased and the thermal resistance of the transfer path H2 can be increased.

As described above, the heat receiving portion **5*a*11 has the first surface F1 and the second surface F2 facing directions opposite to each other. Here, the first surface F1 is a heat receiving surface receiving the heat from the heater 56. The head chip 54 has the case 54*h* provided with an ink flow path. The case 54*h* is fixed to the second surface F2 and is made of a material lower in thermal conductivity than the holder 53. By the constituent material of the case 54*h* being lower in thermal conductivity than the holder 53 as described above, it is possible to reduce heat dissipation from the ink in the head chip 54. Here, it is difficult to transfer the heat from the heat receiving portion 5*a*11 to the case 54*h*. As a result, the heat moves with relative ease through the holder 53 in the direction toward the support body 41. Accordingly, when the case 54*h* is used, it is particularly useful to make it difficult to dissipate heat from the support body 41** as described above.

As described above, the flow path structure 51 is disposed at a position in the direction opposite to the normal direction of the nozzle surface FN with respect to the holding portion Sal and the heater 56 is disposed between the holding portion Sal and the flow path structure 51. The flow path structure 51 is disposed at a distance from the outer wall portion **5*b*. Accordingly, it is possible to reduce direct heat dissipation from the flow path structure 51 to the outer wall portion 5*b***.

As described above, the outer peripheral surface of the side wall portion **5*a*12 is disposed at a distance over the entire area with respect to the inner peripheral surface of the outer wall portion 5*b* when viewed in the normal direction of the nozzle surface FN. Accordingly, it is possible to reduce direct heat dissipation from the side wall portion 5*a*12 to the outer wall portion 5*b***.

As described above, the flange portion **5*c* surrounds the outer wall portion 5*b* over the entire circumference when viewed in the normal direction of the nozzle surface FN. Accordingly, the flange portion 5*c* is capable of preventing the mist resulting from ink ejection at the head chip 54 from wrapping around vertically above the support body 41 from the nozzle surface FN. As for the flange portion 5*c*, the heat of the heater 56 may be dissipated to the support body 41 from the entire circumference of the flange portion 5*c* surrounding the outer wall portion 5*b*. However, the outer peripheral surface of the side wall portion 5*a*12 that is viewed in the normal direction of the nozzle surface FN is disposed at a distance over the entire area with respect to the inner peripheral surface of the outer wall portion 5*b* as described above, and thus it is possible to reduce direct heat dissipation from the side wall portion 5*a*12 to the outer wall portion 5*b***.

2. Second Embodiment

Hereinafter, a second embodiment of the present disclosure will be described. Elements in the form exemplified below that are identical in action and function to those of the first embodiment are denoted by the same reference numerals as those used in the description of the first embodiment with detailed description thereof omitted as appropriate.

Figure 12:
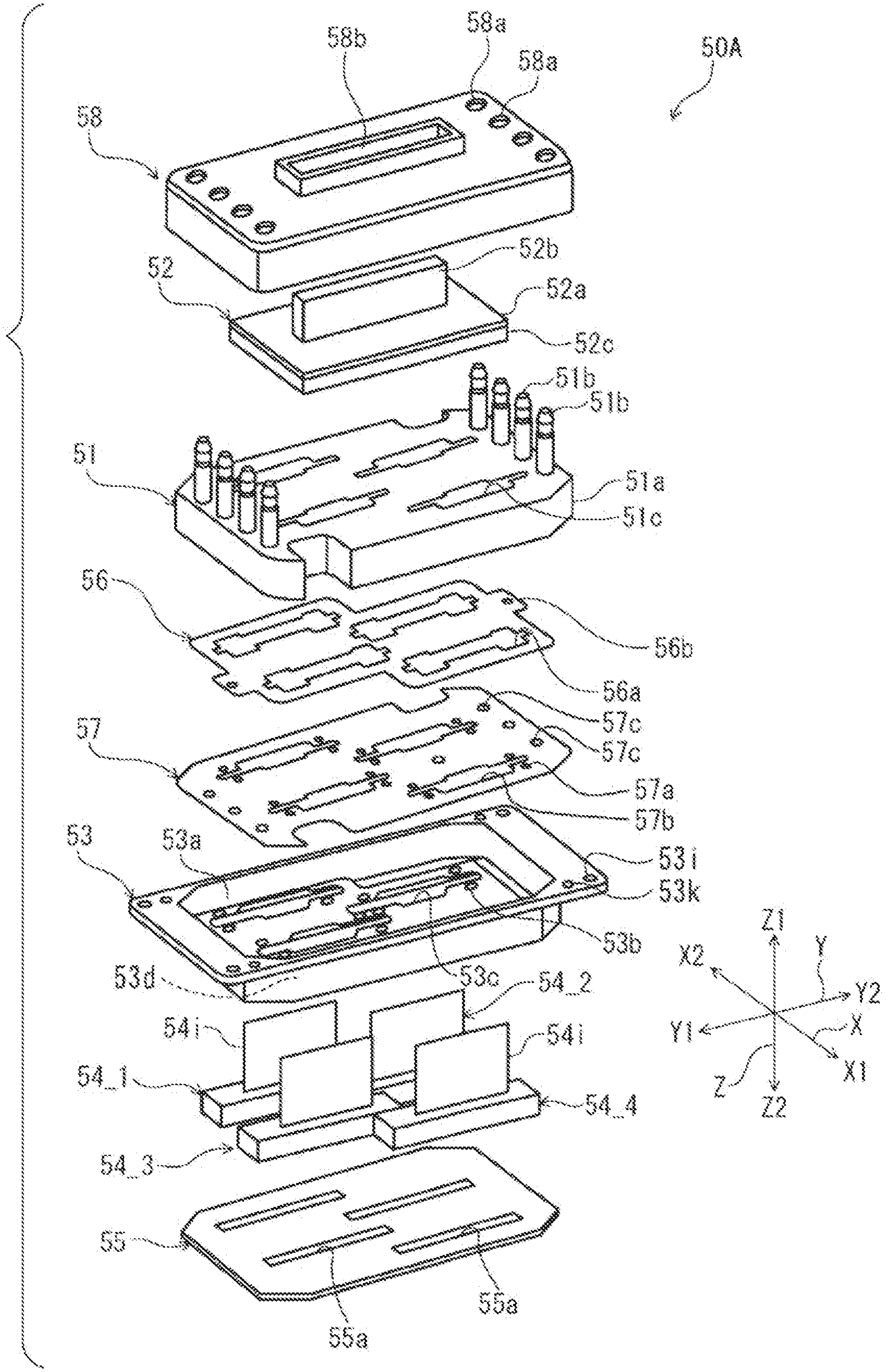
FIG. 12 is an exploded perspective view of a liquid ejecting head according to a second embodiment.

FIG. 12 is an exploded perspective view of a liquid ejecting head 50A according to the second embodiment. The liquid ejecting head 50A is identical to the liquid ejecting head 50 of the first embodiment described above except for the disposition of the heater 56 and the heat transfer member 57.

As illustrated in FIG. 12, in the present embodiment, the order of arrangement of the heater 56 and the heat transfer member 57 in the direction along the Z axis is opposite to that of the first embodiment described above. In other words, in the liquid ejecting head 50A, the cover 58, the substrate unit 52, the flow path structure 51, the heater 56, the heat transfer member 57, the holder 53, the four head chips 54, and the fixing plate 55 are arranged in this order toward the Z2 direction. The heat transfer member 57 of the present embodiment is an example of "first heat transfer member".

The temperature of the head chip 54 can be managed with high accuracy in the second as well as first embodiment. In the example illustrated in FIG. 13, the plan-view shapes of the flow path structure 51, the heater 56, and the heat transfer member 57 are the same as those in the first embodiment described above. In other words, in a plan view, the heat transfer member 57 overlaps the first outside part RE**1*b*. In addition, when each of the heater 56 and the flow path structure 51 overlaps the first outside part RE1*b* in a plan view, the heat from the heater 56** can be transferred to the holding portion Sal without waste.

The plan-view shape of the heater 56 is not limited thereto. For example, the shape may be the same as the plan-view shape of the flow path structure 51 or the heat transfer member 57. In other words, in a plan view, each of the heater 56 and the flow path structure 51 may overlap the first outside part RE**1*b*. In this case, it is possible to reduce a variation in the temperature distribution of the flow path structure 51 even with the heat transfer member 57 absent between the heater 56 and the flow path structure 51**.

In addition, the plan-view shape of the heat transfer member 57 may be, for example, substantially the same as the plan-view shape of the heater 56. In other words, in a plan view, the heat transfer member 57 may not substantially overlap the first outside part RE**1*b*. Here, the heat transfer member 57 not substantially overlapping the first outside part RE1*b* includes the part of the first region RE1 outside the outer edge of the heat transfer member 57 not overlapping by 50% or more of the area of the first outside part RE1*b*. More preferably, the heat transfer member 57 not substantially overlapping the first outside part RE1*b* means that the part of the first region RE1 outside the outer edge of the heat transfer member 57 does not overlap by 75% or more of the area of the first outside part RE1*b***.

The heat transfer member 57 is interposed between the heater 56 and the holder 53, and thus the heat of the heater 56 can be easily moved in the direction parallel to the nozzle surface FN by the heat transfer member 57 and a variation in the temperature distribution of the holding portion Sal can be reduced.

3. Third Embodiment

Hereinafter, a third embodiment of the present disclosure will be described. Elements in the form exemplified below that are identical in action and function to those of the first embodiment are denoted by the same reference numerals as those used in the description of the first embodiment with detailed description thereof omitted as appropriate.

Figure 13:
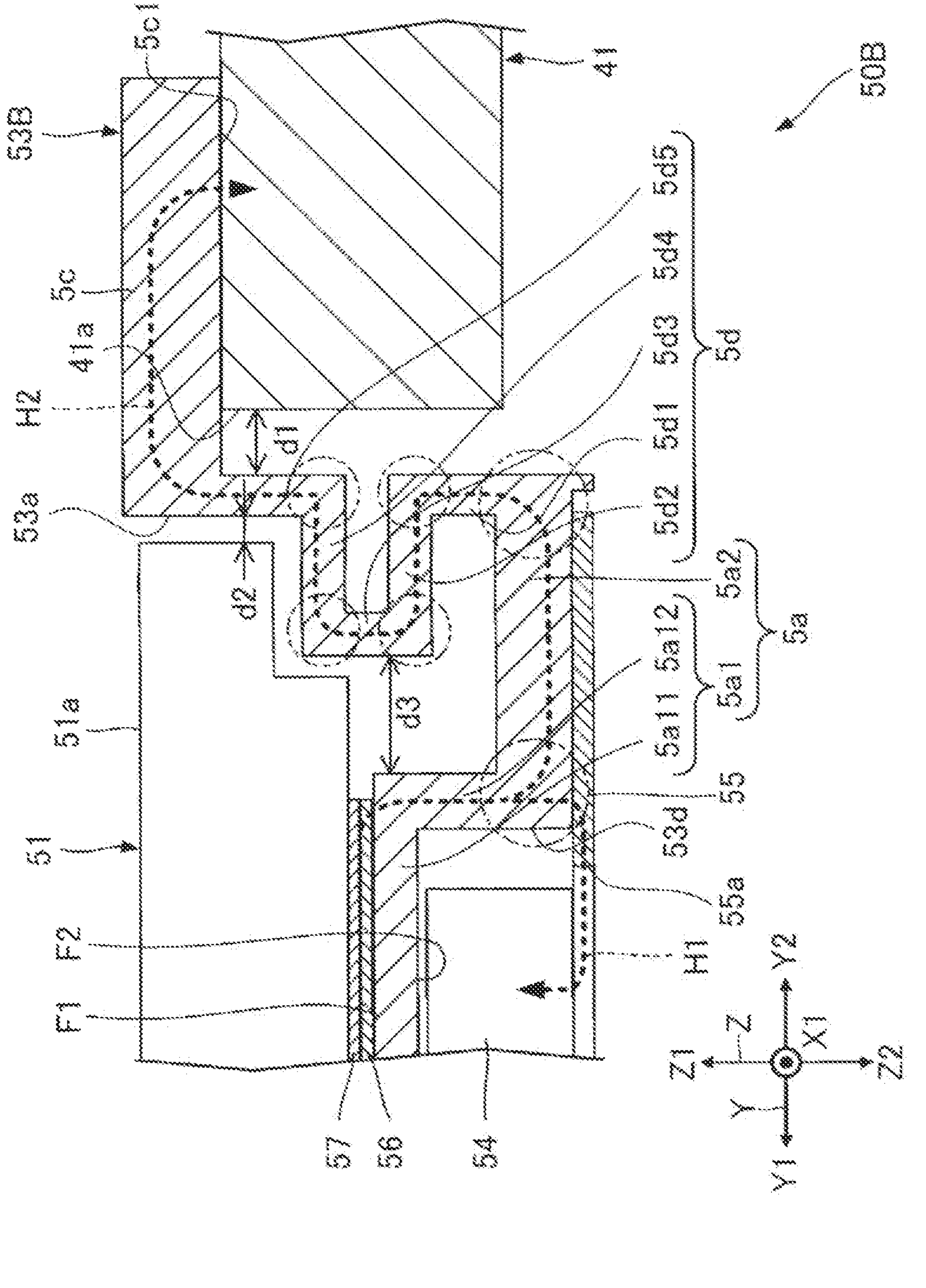
FIG. 13 is a diagram illustrating a transfer path of heat from a heater in a third embodiment.

FIG. 13 is a diagram illustrating the transfer path H1 and the transfer path H2 of the heat from the heater 56 in the third embodiment. A liquid ejecting head 50B of the present embodiment is the same as the liquid ejecting head 50 of the first embodiment described above except that the holder 53 is replaced with a holder 53B. The holder 53B is the same as the holder 53 except that the holder 53B has an outer wall portion 5*d* instead of the outer wall portion 5*b*.

The outer wall portion 5*d* couples the outer peripheral edge of the coupling portion 5*a*2 of the bottom portion 5*a* and the inner peripheral edge of the flange portion 5*c*. Here, the outer wall portion 5*d* has a first wall portion 5*d*1, a first plate portion 5*d*2, a second wall portion 5*d*3, a second plate portion 5*d*4, and a third wall portion 5*d*5.

The first wall portion 5*d*1 has a tubular shape extending in the Z1 direction from the coupling portion 5*a*2. The first plate portion 5*d*2 has a plate shape extending from the first wall portion 5*d*1 in a direction orthogonal to the Z axis so as to approach the holding portion 5*a*1. The second wall portion 5*d*3 has a tubular shape extending in the Z1 direction from the first plate portion 5*d*2. The second plate portion 5*d*4 has a plate shape extending from the second wall portion 5*d*3 in a direction orthogonal to the Z axis so as to be away from the holding portion 5*a*1. The third wall portion 5*d*5 has a tubular shape extending in the Z1 direction from the second plate portion 5*d*4.

The temperature of the head chip 54 can be managed with high accuracy in the third as well as first embodiment. In the present embodiment, the bottom portion 5*a* and the flange portion 5*c* are coupled via the outer wall portion 5*d*, and thus the transfer path H2 of the heat from the heater 56 to the support body 41 is bent or curved at six or more points. The regions surrounded by the two-dot chain lines in FIG. 13 are the six points where the transfer path H2 is bent or curved. By the transfer path H2 being bent or curved at four or more points as described above, the thermal resistance of the transfer path H2 can be advantageously increased with ease as compared with the first embodiment. As in the first embodiment described above, "shortest path from the heat receiving portion 5*a*11 to the flange portion 5*c*" does not include the path of the heat that moves in the heat receiving portion 5*a*11 and the flange portion 5*c*.

4. Modification Examples

The forms exemplified above can be variously modified. Exemplified below are specific aspects of modification applicable to the forms described above. Any two or more aspects selected from the following examples can be appropriately merged to the extent that the aspects are not mutually contradictory.

4-1. Modification Example 1

In the form described above, the plan-view shape of the holding portion Sal is non-rectangular in accordance with the disposition of the four head chips 54. The plan-view shape of the holding portion 5*a*1 is not limited to the above form. For example, the shape may be a rectangular or substantially rectangular shape.

4-2. Modification Example 2

In the form described above, the plan-view shape of the heater 56 is non-rectangular in accordance with the disposition of the four head chips 54. The plan-view shape of the heater 56 is not limited to the above form. For example, the shape may be a rectangular or substantially rectangular shape. Although the heater 56 in the above form is disposed between the flow path structure 51 and the holder 53, the present disclosure is not limited thereto and the flow path structure 51 may be interposed between the heater 56 and the holder 53. The installation posture of the heater 56 is not limited to the posture along the nozzle surface FN and may be, for example, perpendicular to or inclined with respect to the nozzle surface FN. The heater 56 is not limited to a planar heater and may be, for example, a block-shaped heater.

4-3. Modification Example 3

In the form described above, a configuration using one heat transfer member 57 is exemplified. However, the present disclosure is not limited thereto. For example, a form in which the first embodiment and the second embodiment are combined may be used. In other words, the heat transfer member 57 may be disposed between the heater 56 and the holder 53 and between the heater 56 and the flow path structure 51.

4-4. Modification Example 4

An elastic sheet may be disposed between the holder 53 and the flow path structure 51, which are rigid bodies. An elastomer or the like can be adopted as the elastic sheet. For example, it is desirable to select a thermally conductive sheet higher in thermal conductivity than the resin material constituting the case 54*h* of the head chip 54. It is preferable to use a material having a thermal conductivity of 1.0 W/m·K or more as the elastic and thermally conductive sheet higher in thermal conductivity than the resin material. Specifically, an acrylic or silicon-based sheet, a material in which a metal material such as silicon, stainless steel, aluminum, titanium, and a magnesium alloy is dispersed in an elastomer, a composite material in which an elastic material such as an elastomer contains a filler such as a carbon-based filler such as a carbon fiber-based filler, a ceramic oxide such as silica and alumina, and a ceramic nitride such as silicon nitride and boron nitride, or the like is suitable as the thermally conductive sheet. By filling the gap between the holder 53 and the flow path structure 51 with an elastic material as described above, it is possible to enhance adhesiveness between the heat transfer member 57 and the heater 56 and an object of heating such as the holder 53 and the flow path structure 51 and efficiently transfer the heat from the heater 56 to the heating object even in the event of a manufacturing error in the thickness dimension of the holder 53 or the flow path structure 51 pertaining to the direction along the Z axis.

4-5. Modification Example 5

"Outer edge OE2 of the heater 56" in the above embodiment may be read as the outer edge of the region of formation of the heat-generating resistor of the heater 56.

4-6. Modification Example 6

In a plan view, the heater 56 may not overlap the first outside part RE1*b*. In this configuration, the area of the heater 56 can be reduced. In addition, the first outside part RE1*b* lacks the head chip 54_1, the head chip 54_2, and the holding portion Sal, and thus the heater 56 does not overlap the first outside part RE1*b* in a plan view and useless heat generation of the heater 56 can be further reduced.

4-7. Modification Example 7

Exemplified in the above form is a configuration in which the liquid ejecting head 50 has four head chips 54. However, the present disclosure is not limited thereto, and the number may be three or less or five or more. In the above form, the head chips 54 are staggered along the longitudinal direction of the head chips 54. However, the present disclosure is not limited thereto. The head chips 54 may be staggered along the lateral direction of the head chips 54.

4-8. Modification Example 8

Although the serial liquid ejecting apparatus 100 in which the support body 41 supporting the liquid ejecting head 50 reciprocates is exemplified in the above form, the present disclosure is also applicable to a line-type liquid ejecting apparatus in which the nozzles N are distributed over the entire width of the medium M. In other words, the support body supporting the liquid ejecting head 50 is not limited to a serial carriage and may be a structure supporting the liquid ejecting head 50 in a line-type liquid ejecting apparatus. In this case, a plurality of the liquid ejecting heads 50 are, for example, disposed side by side in the width direction of the medium M and the liquid ejecting heads 50 are collectively supported by one support body.

4-9. Modification Example 9

The liquid ejecting apparatus exemplified in the above form can be adopted in various types of equipment such as a facsimile machine and a copier as well as dedicated printing equipment. However, the use of the liquid ejecting apparatus is not limited to printing. For example, a liquid ejecting apparatus that ejects a solution of a coloring material is used as a manufacturing apparatus for forming a color filter of a display device such as a liquid crystal display panel. In addition, a liquid ejecting apparatus that ejects a solution of a conductive material is used as a manufacturing apparatus for forming an electrode or wiring of a wiring substrate. In addition, a liquid ejecting apparatus that ejects a solution of a living body-related organic substance is used as, for example, a biochip manufacturing apparatus.

What is claimed is:

1. A liquid ejecting head supported by a support body, the liquid ejecting head comprising:

a first head chip configured to eject a liquid;

a holder having a holding portion holding the first head chip and a flange portion coming into contact with the support body at a position away from the holding portion; and a heater heating the holding portion, wherein the heater and the support body are spaced apart from each other, the holding portion has a heat receiving portion receiving heat from the heater, and a shortest path of heat transferred through the holder from the heat receiving portion to the flange portion is bent or curved at two or more points.

2. The liquid ejecting head according to claim 1, wherein the shortest path is bent or curved at four or more points.

3. A liquid ejecting apparatus comprising:

the liquid ejecting head according to claim 1; and the support body supporting the liquid ejecting head.

4. The liquid ejecting head according to claim 1, wherein in the shortest path of heat transferred through the holder from the heat receiving portion to the flange portion, a first heat transfer direction in a part of the holder and a second heat transfer direction in another part of the holder are opposite to each other.

5. The liquid ejecting head according to claim 1, wherein the first head chip has a nozzle surface provided with a nozzle configured to eject the liquid in an ejection direction, and the flange portion disposed outside of the heat receiving portion when viewed in the ejection direction.

6. The liquid ejecting head according to claim 1, wherein the heater disposed inside of the liquid ejecting head.

7. The liquid ejecting head according to claim 1, further comprising a second head chip configured to eject a liquid, wherein the holding portion further holds the second head chip.

8. The liquid ejecting head according to claim 1, wherein the holder has an upper surface and a lower surface outwardly opposite to each other, and the lower surface directly faces the first head chip, the heater is disposed on the upper surface of the holder, the first head chip directly faces the heater via the holder at a position of the heat receiving portion, and the flange portion outwardly projects toward the support body.

9. A liquid ejecting head supported by a support body, the liquid ejecting head comprising:

a first head chip configured to eject a liquid;

a holder having a holding portion holding the first head chip and a flange portion coming into contact with the support body at a position away from the holding portion; and a heater heating the holding portion, wherein the holding portion has a heat receiving portion receiving heat from the heater, a shortest path of heat transferred through the holder from the heat receiving portion to the flange portion is bent or curved at two or more points, the first head chip has a nozzle surface provided with a nozzle configured to eject the liquid in an ejection direction, the heater is disposed in a direction opposite to the ejection direction with respect to the holding portion, the holding portion further has a side wall portion extending in the ejection direction from the heat receiving portion, the heat receiving portion and the side wall portion form a space accommodating the first head chip, the holder has an outer wall portion coupled to the flange portion and surrounding the side wall portion when viewed in the ejection direction and a coupling portion coupling the side wall portion and the outer wall portion, the coupling portion extends in a direction intersecting with the ejection direction, and each of the side wall portion and the outer wall portion extends from the coupling portion in the direction opposite to the ejection direction.

10. The liquid ejecting head according to claim 9, wherein the flange portion is disposed at a position in the direction opposite to the ejection direction beyond the heat receiving portion.

11. The liquid ejecting head according to claim 9, wherein the heat receiving portion has a first surface and a second surface facing a direction opposite to a direction that the first surface faces, the first surface is a heat receiving surface receiving heat from the heater, the first head chip has a case provided with a liquid flow path, and the case is fixed to the second surface and is made of a material lower in thermal conductivity than the holder.

12. The liquid ejecting head according to claim 9, further comprising a flow path structure including a flow path of the liquid supplied to the first head chip, wherein the heater is disposed between the holding portion and the flow path structure, and the flow path structure is disposed at a distance from the outer wall portion.

13. The liquid ejecting head according to claim 9, wherein an outer peripheral surface of the side wall portion viewed in the ejection direction is disposed with a gap formed over an entire area with respect to an inner peripheral surface of the outer wall portion.

14. The liquid ejecting head according to claim 13, wherein the flange portion surrounds the outer wall portion over an entire circumference when viewed in the ejection direction.

15. The liquid ejecting head according to claim 9, further comprising a second head chip configured to eject a liquid, wherein the holding portion further holds the second head chip.

16. The liquid ejecting head according to claim 15, further comprising a third head chip and a fourth head chip configured to eject a liquid and adjacent to each other, wherein the first head chip and the second head chip are adjacent to each other, the first head chip and the second head chip are disposed to be offset from each other in both a first direction and a second direction, the first direction and the second direction that are two directions intersecting with each other along the nozzle surface, the third head chip and the fourth head chip are disposed to be offset from each other in both the first direction and the second direction, the first head chip is in contact with a first side and a third side when viewed in the first direction, the second head chip is in contact with a second side when viewed in the first direction, the third head chip is in contact with the third side when viewed in the first direction, and the fourth head chip is in contact with the second side and a fourth side when the first side is one of four sides of a virtual rectangle circumscribing an aggregate of the first head chip, the second head chip, the third head chip, and the fourth head chip when viewed in the first direction, the second side is coupled to one end of the first side, the third side is coupled to the other end of the first side, and the fourth side is the side of the virtual rectangle other than the first side, the second side, and the third side, and each of a first region surrounded by the first side, the second side, the first head chip, and the second head chip when viewed in the first direction and a second region surrounded by the third side, the fourth side, the third head chip, and the fourth head chip when viewed in the first direction includes a part positioned outside an outer edge of the side wall portion.

17. The liquid ejecting head according to claim 9, wherein the support body is provided with an opening into which the outer wall portion is inserted, the flange portion has an attachment surface facing the ejection direction, and the holder is attached to the support body in a state where the outer wall portion is inserted in the opening at a distance from the support body and the attachment surface is in contact with the support body.

18. A liquid ejecting apparatus comprising:

the liquid ejecting head according to claim 9; and the support body supporting the liquid ejecting head.

19. A liquid ejecting head supported by a support body, the liquid ejecting head comprising:

a head chip having a nozzle surface provided with a nozzle configured to eject a liquid in an ejection direction;

a holder having a holding portion holding the head chip, a flange portion coming into contact with the support body at a position away from the holding portion, an outer wall portion coupled to the flange portion and surrounding the holding portion when viewed in the ejection direction, and a coupling portion coupling the holding portion and the outer wall portion; and a heater heating the holding portion, wherein the holding portion protrudes from the coupling portion in a direction opposite to the ejection direction, and the outer wall portion extends from the coupling portion toward the flange portion in the direction opposite to the ejection direction.

20. A liquid ejecting apparatus comprising:

the liquid ejecting head according to claim 19; and the support body supporting the liquid ejecting head.

* * * * *